(12) United States Patent
Osha et al.

(10) Patent No.: US 6,868,656 B2
(45) Date of Patent: *Mar. 22, 2005

(54) COMFORT MANAGEMENT SYSTEM FOR EQUINE

(76) Inventors: Tommy Lee Osha, 4000 Corinth Rd., Lexington, TN (US) 38351; Martin L. Rand, 1815 107 Ave. SE., Bellevue, WA (US) 98004; Gary A. Berg, 824 E. Beck La., Phoenix, AZ (US) 85022

( * ) Notice: Subject to any disclaimer, the term of this patent is extended or adjusted under 35 U.S.C. 154(b) by 0 days.

This patent is subject to a terminal disclaimer.

(21) Appl. No.: 10/669,735

(22) Filed: Sep. 24, 2003

(65) Prior Publication Data

US 2004/0065063 A1 Apr. 8, 2004

Related U.S. Application Data

(63) Continuation of application No. 10/243,704, filed on Sep. 14, 2002, now Pat. No. 6,651,410
(60) Provisional application No. 60/322,417, filed on Sep. 15, 2001.

(51) Int. Cl.$^7$ ............................. B68C 5/00; A01L 15/00
(52) U.S. Cl. .............................................. 54/82; 166/2
(58) Field of Search .......................... 54/82; 168/2, 17, 168/18, 27

(56) References Cited

U.S. PATENT DOCUMENTS

| | | | |
|---|---|---|---|
| 630,310 A | * | 8/1899 | Agnew ........................... 168/2 |
| 751,184 A | * | 2/1904 | Larsen .......................... 168/27 |
| 777,514 A | * | 12/1904 | Jennings et al. .............. 168/27 |
| 2,041,538 A | | 5/1936 | Gash et al. |
| 2,064,566 A | | 12/1936 | Richman |
| 2,446,371 A | | 8/1948 | Jones |
| 2,988,828 A | | 6/1961 | Anderson |
| 3,209,726 A | | 10/1965 | Fisher |
| 3,236,310 A | | 2/1966 | Quick |
| 3,285,346 A | | 11/1966 | Jenny et al. |
| 3,386,226 A | | 6/1968 | Code et al. |
| 3,486,561 A | | 12/1969 | Kulak |
| 3,703,209 A | | 11/1972 | Glass |
| 3,732,929 A | | 5/1973 | Glass |
| 3,794,119 A | | 2/1974 | Paiso et al. |
| 3,967,683 A | | 7/1976 | Ensinozo |
| 4,155,406 A | | 5/1979 | Hourlier |
| 4,174,754 A | | 11/1979 | Glass |
| 4,290,487 A | | 9/1981 | Unger |
| 4,736,800 A | | 4/1988 | Rohner |
| 4,981,010 A | | 1/1991 | Orza et al. |
| 5,174,382 A | | 12/1992 | Wright |
| 5,209,048 A | | 5/1993 | Hanson |
| 5,224,549 A | | 7/1993 | Lightner |
| 5,363,632 A | | 11/1994 | Armato |
| 5,588,288 A | | 12/1996 | Origgi et al. |
| 5,661,958 A | | 9/1997 | Glass et al. |
| 5,715,661 A | | 2/1998 | Meyers |
| 5,983,611 A | | 11/1999 | Smahl et al. |
| 6,062,008 A | | 5/2000 | Nor |
| 6,305,328 B1 | | 10/2001 | Marquis |
| 6,393,810 B1 | | 5/2002 | Mier |
| 6,651,410 B2 | * | 11/2003 | Osha et al. ..................... 54/82 |

* cited by examiner

Primary Examiner—Teri P. Luu
Assistant Examiner—Elizabeth Shaw
(74) Attorney, Agent, or Firm—Dennis A. DeBoo

(57) ABSTRACT

The present invention relates generally to a comfort management system for equine and, in particular, to a multi-purpose, multi-functional hoof-ware device, boot or shoe and multiple, interchangeable inserts for all equine hooves that uses, attaches, wraps, and fits the hoof while the equine is stalled, walking, trotting, loping for the purposes of protection, healing, alignment, cushioning and/or any other medicinal purposes for any given period of time fitting all sizes of equine hooves in multiple hoof environments, such as, diagnostics, normal use, during and after performance, corrective, medicinal purposes, emergencies situations, for preventative purposes, and rehabilitation of the hoof.

17 Claims, 14 Drawing Sheets

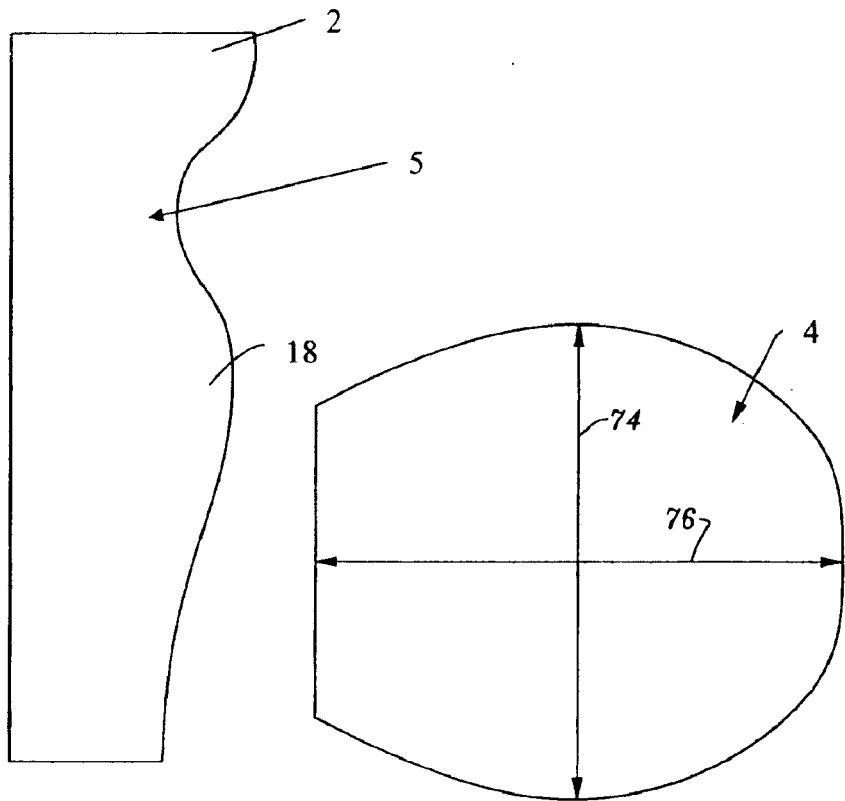
Fig. 9
Fig. 10
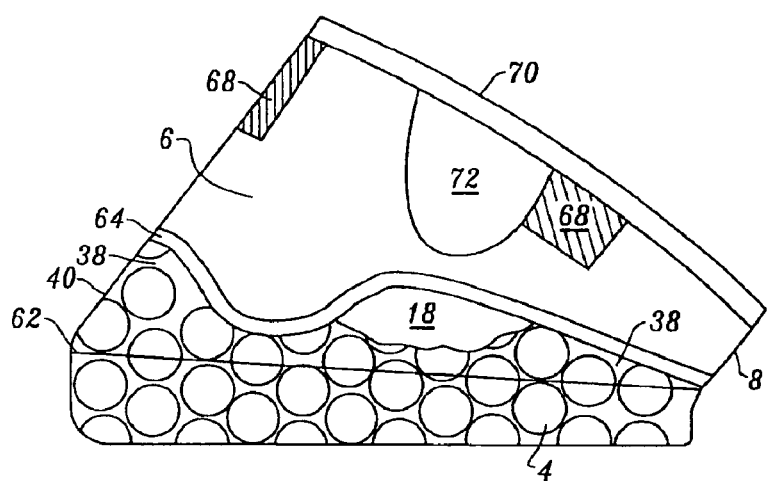
Fig. 11

COMFORT MANAGEMENT SYSTEM FOR EQUINE

CROSS-REFERENCE TO RELATED APPLICATIONS

This application is a continuation patent application of U.S. application Ser. No. 10/243,704, filed Sep. 14, 2002 now U.S. Pat. No. 6,651,410, currently pending and entitled to the benefit of Provisional Patent Application Ser. No. 60/322,417 filed Sep. 15, 2001.

FIELD OF THE INVENTION

The present invention relates generally to a comfort management system for equine and, in particular, to a multi-purpose, multi-functional hoof-ware device, boot or shoe and inserts used in conjunction therewith, suitable for use on all equine hooves in all equine environments and in the treatment of different equine aliments.

BACKGROUND OF THE INVENTION

As is well known in the art, hoof-ware devices or steel shoes are designed to protect a horses hoof from the environment. Generally, equine steel shoe devices are attached to the bottom side of the horses hoof with "tangible" nails. Alternatively, other types of hoof-ware are available which are attached to the horses hoof by the use of a strap or multiple straps, molding the boot around the horses hoof, shrinking the material around the horses hoof, and/or clamping the boot to the horse hoof with metal brackets. It is also known to use "metal" or "plastic" inserts inside of the aforementioned boots to provide protection and to stabilize the hoof.

For example, to a limited degree, features encompassing equine hoof-ware devices are disclosed in the size-adjustable composition horse boot prior art invention U.S. Pat. No. 5,661,958 wherein a hard rubber device is used with a tensioning means including external brackets having a plurality of outwardly directed projections to provide an adjustable fit boot. The focus of this invention is to provide an adjustable mechanism to the boot to allow variation of the distance from the back of a serrated strap to the toe of the boot.

Prior art for invention U.S. Pat. No. 3,703,209, teaches a molded horseshoe which eliminates the need for frequent shoeing of the metal type and provides protection to the horses hoof.

U.S. Pat. No. 4,981,010 relates generally to a horseshoe, and in particular to a molded flexible horse boot focusing on the replacement of the metal horseshoe. The molded boot is designed to distribute the weight around the horse hoof and to also cover the hoof to keep it from direct contact with the ground.

Prior art for invention U.S. Pat. No. 4,174,754 relates to the adjustable boot-type composition horseshoe related to an improvement in composition horseshoes particularly of the type disclosed in U.S. Pat. No. 3,732,929 issued May 15, 1973 to Neel W. Glass and in U.S. Pat. No. 3,703,209 issued Nov. 21, 1972 to Neel W. Glass. These patents disclose 3 one piece molded horseboots or horseshoe type inventions to replace the horseshoe and having a sole and somewhat flexible envelope for surrounding the horse's hoof below the coronary band. The focus of these prior art patents is primarily on using side brackets, barbs, and brackets for tensioning. U.S. Pat. Nos. 3,703,209 and 3,732,929 disclose molded boots for horses secured in place by a cable and toggle arrangement.

Prior art for invention U.S. Pat. No. 5,174,382, issued Dec. 29, 1992, is a boot device and method for use in preventing laminitis in the foot of a horse. The boot is designed to fit over the horse's hoof. A bladder is positioned inside of the boot and beneath the frog of the horse's hoof. A pump is connected to the bladder to provide pulsating pressure to the frog of the horse's hoof to simulate the pressure applied to the frog while the horse is walking.

U.S. Pat. No. 5,588,288, issued Dec. 31, 1996, teaches a boot for horse's hooves designed for shod horses, that stays firmly anchored to the hoof and yet does not damage the structure of the hoof itself. This invention focuses on the equine hoof effects concerned with stabilizing, equalizing and comforting the loaded and/or unloaded shod hoof.

U.S. Pat. No. 3,967,683, issued Jul. 6, 1976, teaches a slipper-like footwear device in the form of a split ring having a configuration substantially corresponding to the peripheral configuration of a hoof with the split at the rear or heal portion of the slipper. This hoof-ware invention focuses on the equine hoof effects concerned with stabilizing, equalizing and comforting the loaded and/or unloaded hoof, shod or unshod.

U.S. Pat. Nos. 2,988,828 and 3,486,561 disclose an animal boot of unitary molded construction with an annular wall of limited resiliency. U.S. Pat. Nos. 2,446,371, 2,064, 566, and 3,209,726 disclose boots for dogs also of a flexible construction and generally shaped to fit the foot. U.S. Pat. No. 3,285,346 discloses a hoof covering molded in place to the hoof lower surfaces. U.S. Pat. Nos. 3,794,119 and 4,155,406 disclose boots held in place by straps or a strap. U.S. Pat. No. 3,236,310 discloses a boot of heat sensitive material thermally shrunk into place on the hoof. U.S. Pat. No. 3,967,683 discloses a bifurcated boot for clamping to the hoof. U.S. Pat. No. 3,386,226 discloses an elastomeric scalper-type covering disposable about the hoof to protect the hoof. U.S. Pat. No. 2,041,538 discloses a rubber horse boot having a continuous wall integral with the boot sole with the frontal wall portion being of greater height than the rear wall portion.

Prior art for invention U.S. Pat. No. 4,736,800, issued Apr. 12, 1988, is referred to as footwear for hoofed animals comprising a cup-like, closed, resilient unit having a sole and hoof-covering part used as a substitute for a shoe and may be suitable for treatment of sick animals. This hoof-ware invention focuses on the equine hoof effects concerned with stabilizing, equalizing and comforting the loaded and/or unloaded hoof, shod or unshod.

Prior art for invention U.S. Pat. No. 5,715,661, issued Feb. 10, 1998, discloses a boot for horses designed for protecting a horse's hoof from damage, improved adjustability, is simple in structure, easy to put on the hoof, does not inadvertently pop open and is devoid of damaging internal metal protuberances. This hoof-ware invention focuses on the equine hoof effects concerned only with stabilizing, equalizing and comforting the loaded and/or unloaded hoof, shod or unshod.

Prior art for invention U.S. Pat. No. 4,290,487, issued Sep. 22, 1981, teaches a protective boot of unitary construction shaped so as to lend itself to temporary radical distortion.

Prior art for invention U.S. Pat. No. 5,209,048, issued May 11, 1993, teaches a device with means for irrigation of medication and removal of fluids in the treatment of hoof injuries and disorders. This hoof-ware invention focuses on the equine hoof effects concerned with stabilizing, equalizing and comforting the loaded and/or unloaded hoof, shod or unshod.

Prior art for invention U.S. Pat. No. 5,363,632, issued Nov. 15, 1994, discloses an equine athletic boot which includes a panel of shock absorbing material that is wrapped around the lower leg of a horse for support and protection in the area of the pastern, fetlock, and canon bone, comprising shock absorbing material with a vertically oriented tubular bladder carried by the panel.

However, equine hoof steel one-dimensional shoes of known types, as well as the other types of hoof-ware discussed above, generally do not provide for optimized balanced cushioning, flexibility and comfort while also providing healing enhancements for different equine hoof ailments encountered in the overall normal wear of the horse's hoofs. Also of consideration is the prior art's silence regarding diagnostic, medical, corrective, rehabilitated and/or emergency environments related to horse hoof care. The known prior art does not provide for a "single" horse hoof-ware shoe and/or boot which addressees all of the foregoing needs, i.e., normal wear and tear to the horses hoof through the owners/caretakers use of the horse, and diagnostic, medical corrective, rehabilitated and/or emergency environments related to horse hoof care. Moreover, the prior art teaches horse style boots or hoof coverings primarily used for protective purposes. The boots/coverings have a problem of retention on the hoof because of forces, common and uncommon, to the hoof. The prior art addresses this retention problem by teaching the attachment of the boots with straps, molding the boot around the hoof, shrinking the materials around the hoof, and/or clamping the boot/covering with metal brackets, all causing the boot to be clumsily installed on the hoof and limited in their use. Also of concern is the problem that horse boots of the prior art have limited adjustability, insecure closures which tend to pop open during use, and metal protuberances inside and/or outside of the boot which can do further damage to a horse's hoof. These types of horse boots are also difficult to place on the hoof, with a somewhat complicated structure and are poor fitting which tends to have the horse walk on its toe, creating a stress on the leg. The prior art is also silent with respect to a horse hoof-ware that is adjustable in size such that it can fit any size horse hoof.

Hence, there is a need for solving the problem of providing an equine hoof shoe or boot that provides for optimized balanced cushioning, flexibility and comfort while also providing for healing enhancements for different equine hoof ailments and for a healthily hoof in the overall normal wear and use of the horses hooves. A need also exists for a horse shoe which provides not only either protection from the environment or addresses one specific medical need, but rather there is a need for a shoe which also provides for diagnostic, medical, corrective, rehabilitative, and/or emergency environments related to horse hoof care in a single shoe. A need also exists for horse boots/coverings which are not retained by being strapped with buckles, molded, clamped or retained with metal brackets and when subjected to forces, common and uncommon to the hoof, remains retained on the hoof. A horse shoe/boot is also needed which allows adjustability, and has secure closures that do not pop open during use. A need also exists for a boot which addresses all of the foregoing concerns and short comings in the prior art and further which fits the hoof in a manner that does not cause stress to the leg while in use. Evolving equine industry has established the fact that equine hoof care comprises more than the steel shoe now used in most equine environments. Enhanced flexibility within the healing process in solving multiple equine hoof diseases with the one-dimensional steel shoe is creating an environment wherein more thought is being made to alternative multi-dimensional solutions. Research has led the industry in the direction of a non-shod trend in the major equine environments, including, but not limited to, normal, medicated, corrective, rehabilitative and/or emergencies. This trend suggests there needs to be equine related hoof care shoes and management systems configured to be used in all of the foregoing environments.

SUMMARY OF THE INVENTION

The present invention is distinguished over the known prior art in a multiplicity of ways. For one thing, the present invention provides an equine hoof-ware system which establishes the general framework for equine hoof comfort variations using single and/or multiple inserts. The inserts are affixed to an internal interlocking mechanism uniquely designed inside the equine hoof shoe/boot/hugger to lock each insert while being used to reach the comfort level for the required healthy or unhealthy-to-healthy state of the horse. Individual horse owners/caretakers have available to them through the embodiments of this invention, a complete line of comfort products for their horses including variations, combinations, multiple fixes by using the multiple internal inserts designed for the general comfort, disease, external abnormalities, soft soles, or lost shoes.

Furthermore, the present invention provides an equine "lightweight" versatile hoof-ware specially configured to be used on a "non-shod" equine and for multiple hoof uses in all equine environments. Thus, one horse boot is provided that may be used for comfort, injury, emergency and all other situations arising in equine environments. The inserts are designed in multiple densities, thicknesses, and materials. When used in conjunction with the outer covering/hugger the hoof-ware system stabilizes equine hoof at normal use, enhances the medicinal healing processes as necessary, equalizes loading and unloading, provides corrective measures, optimizes rehabilitation processes, and comforts the hoof in all environments.

Moreover, the present invention, in one preferred form provides an equine hoofware device and specially designed insert devices to be used to comfort shod or non-shod horse hooves in either a healthy or unhealthy state, such as general comfort, cushioning, protection from sharp earthly objects, healing from surgery, recovering from diseases like founder, coffin bone, rotation, thrush, abscesses, general bruises, punctures, frog abnormalities, soft soles, or lost shoes. The insert devices of the present invention, preferably, in one embodiment, fit inside a hoof-ware device designed for multiple hoof mode environments, for example, diagnostics, normal use, performance, corrective, medicinal, emergencies, preventative measures against injury and the like and rehabilitation of the hoof. In addition, the hoof-ware system solves the problem of proper fit in that it is provided in multiple hoof sizes. The hoofware device of the present invention further provides a secure closure so that the device does not "pop open" when in use. Sucinctly, the aim of this invention is to create a hoof-ware device, including inserts, for hoofed animals and more particularly for shod or non-shod horses, which stabilizes and/or equalizes and/or comforts the equine hoof while in multiple environments, such as, normal work, pleasure, performance, preventative maintenance, medication, correction, rehabilitation, emergency and/or diagnostic situations.

In summary, the present invention provides an equine hoof-ware, comprising a sole having a base circumscribed by a peripheral wall having an upwardly and inwardly extending forward most end, an upwardly and outwardly extending rearward most end, and a pair of spaced apart upwardly extending sidewalls interposed between the forward most end and the rearward most end of the peripheral wall for defining a receiving area. A mid-sole received within the receiving area and circumscribed by the peripheral wall is also provided. The hoof-ware also includes a removable insert. An interlocking means is integrally formed with the mid-sole and with the removable insert and comprised of at least one complementary protrusion and indention pair mating of the removable insert and the mid-sole for receiving and interlocking the two together such that the removable insert can be inserted and then removed and replaced with a different removable insert for treating different equine hoof related aliments. The equine hoofware also include a front upper connected to the sole and circumscribing the forward most end and the pair of sidewalls of the sole for defining an opening for receiving an equine hoof into the front upper and onto the mid-sole and sole. The front upper extends upwardly from the sole and mid-sole at an angle and terminates into an upper edge which angles downwardly from the forward most end to the rearward most end of the sole such that the front upper tapers from the forward most end to the rearward most end of the sole for substantially covering a forward region and side regions of the equine hoof received therein. In addition, a contoured back upper comprised of a lower section operatively coupled to the rearward most end of the sole, an upwardly extending bulb section integrally formed with the lower section and shaped to receive an equine bulb of a heel, and a pair of extensions integrally formed with the upwardly extending bulb section for wrapping around the front uppers also provided. Means for coupling the pair of extensions to the front upper are included such that when the equine hoof is received into the front upper and onto the mid-sole and sole and when the pair of extensions are coupled to the front upper the equine hoof is essentially surrounded and secured within the equine hoof-ware.

Moreover, having thus summarized the invention, it should be apparent that numerous modifications and adaptations may be resorted to without departing from the scope and fair meaning of the present invention as set forth as described hereinbelow by the claims.

OBJECTS OF THE INVENTION

Accordingly, a primary object of the present invention is to provide a new, novel and useful comfort management system for equine embodied in a single hoof-ware device.

A further object of the present invention is to provide a system as characterized above which is suitable for use on healthy equine.

Another further object of the present invention is to provide a system as characterized above which is suitable for use on unhealthy equine.

Another further object of the present invention is to provide a system as characterized above for use on shod or non-shod hooves.

Another further object of the present invention is to provide a system as characterized above which provides an outer shell, a sole and a mid sole, the mid-sole including integrally formed interlocking means, into which inserts, the inserts also including integrally formed interlocking means, of different geometric shapes and dimensions may be inserted, removed and/or replaced.

Another further object of the present invention is to provide a system as characterized above which protects equine from earthly objects.

Another further object of the present invention is to provide a system as characterized above for use on equine healing from surgery and/or recovering from any of the many equine diseases which may effect the hoof.

Another further object of the present invention is to provide a system as characterized above which, in one embodiment, provides a hoof-ware device that is designed to fit multiple hoof sizes.

These and other objects and advantages will be made manifest when considering the following detailed specification when taken in conjunction with the appended drawing figures.

BRIEF DESCRIPTION OF THE DRAWINGS

FIG. 9 is a side view of the hoof-ware side wall.

FIG. 10 is a top plan view of the hoof-ware sole.

FIG. 11 is a side view of the hoof-ware sole, attached to the mid-sole, sidewall and upper sleeve.

DESCRIPTION OF PREFERRED EMBODIMENTS

Figure 1:
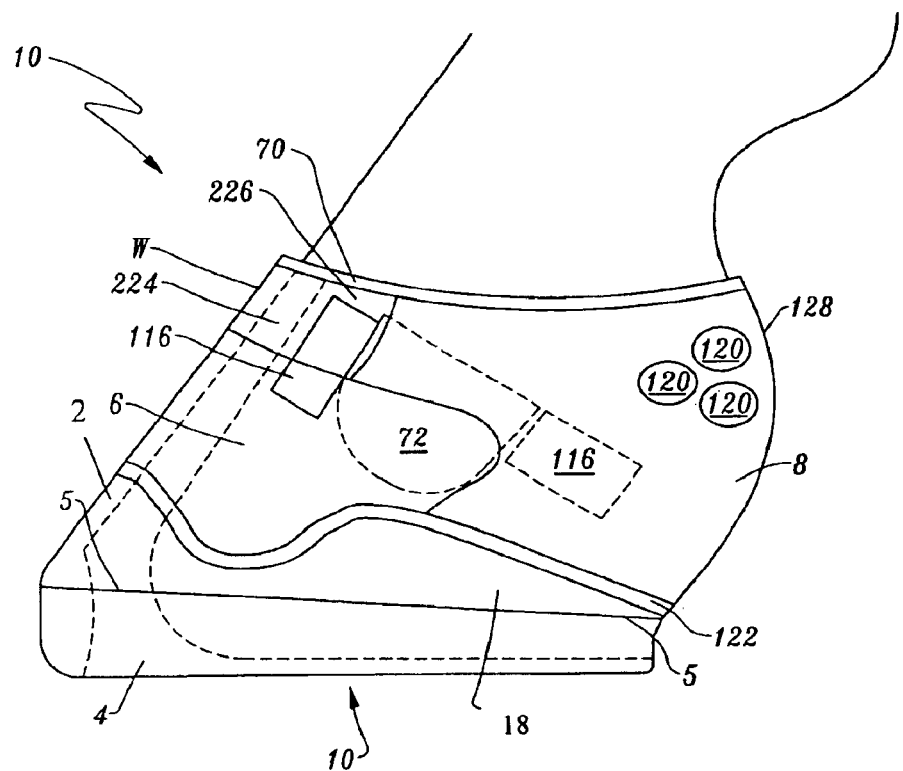
FIG. 1 is a side view of a hoof-ware device shown with the hoof-ware attachments attached thereon.

Considering the drawings, wherein like reference numerals denote like parts throughout the various drawing figures, reference numeral 10 is directed to the comfort management system for equine according to the present invention.

In essence, and referring to the drawings, the present invention provides a comfort management system 10 for equine, comprising a sole 4 having a base circumscribed by a peripheral wall 5 having an upwardly and inwardly extending forward most end defining a countered upper 2, an upwardly and outwardly extending rearward most end 8, and a pair of spaced apart upwardly extending sidewalls 18 interposed between said forward most end and said rearward most end of said peripheral wall for defining a receiving area The system 10 also includes a mid-sole 14 received within said receiving area and circumscribed by said peripheral wall 5. A removable insert 15 is also provided. The system 10 also teaches an interlocking means 12 (FIG. 5) integrally formed with the mid-sole 14 and with said removable insert 15 and comprised of at least one complementary protrusion 16d, 16e, 16f, and 16g and indention pair 16, 16a, 16b, and 16c (FIG. 18) mating the removable insert 15 and the mid-sole 14 for receiving and interlocking said two together such that said removable insert 15 can be inserted and then removed and replaced with a different removable insert, to be discussed hereinabelow, for treating different equine hoof related aliments. The system 10 also includes a front upper 6 connected to the sole 4 and/or mid-sole 14 and circumscribing the forward most end W and the pair of sidewalls of the sole 4 for defining an opening 118 (FIG. 16) for receiving an equine hoof into said front upper 6 and onto said mid-sole 14 and sole 4. The front upper extending upwardly from the sole 4 and mid-sole 14 at an angle and terminating into an upper edge 70 which angles downwardly from the forward most end to the rearward most end of the sole 4 such that the front upper 6 tapers from the forward most end to the rearward most end of the sole 4 for substantially covering a forward region and the regions of the equine hoof received therein. A contoured back upper 8 comprised of a lower section operatively coupled to said rearward most end of said sole 4, an upwardly extending bulb section 128 integrally formed with said lower section and shaped to receive an equine bulb of a heel, and a pair of extensions 226 integrally formed with said upwardly extending bulb section for wrapping around said front upper 6. Means are provided for coupling said pair of extensions to said front upper 6 such that when said equine hoof is received into said front upper 6 and onto the mid-sole 14 and sole 4 and when the pair of extensions 226 are coupled to the front upper 6 the equine hoof is essentially surrounded and secured within the equine hoof-ware.

Figure 17:
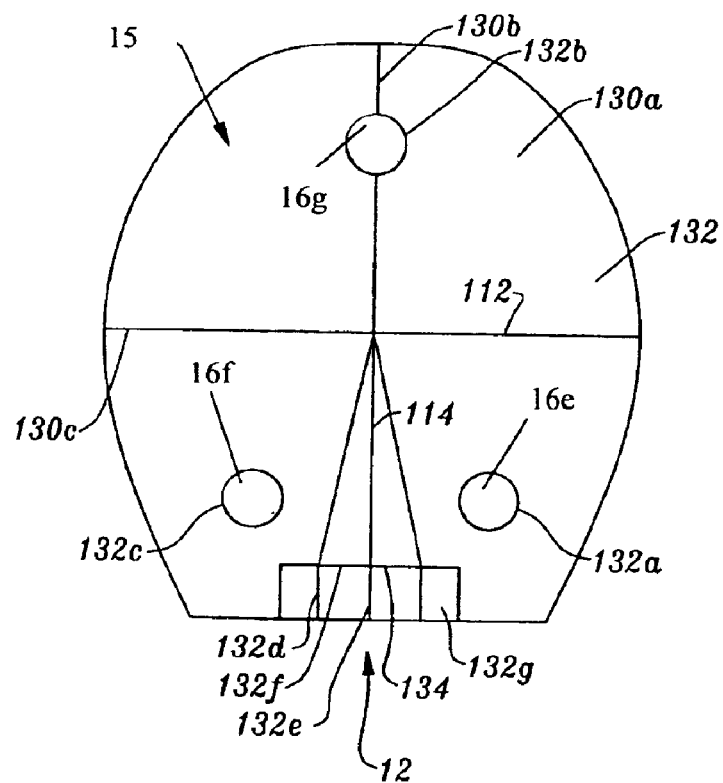
FIG. 17 is a top plan view of the insert and the tri-lock interlocking mechanism.
Figure 18:
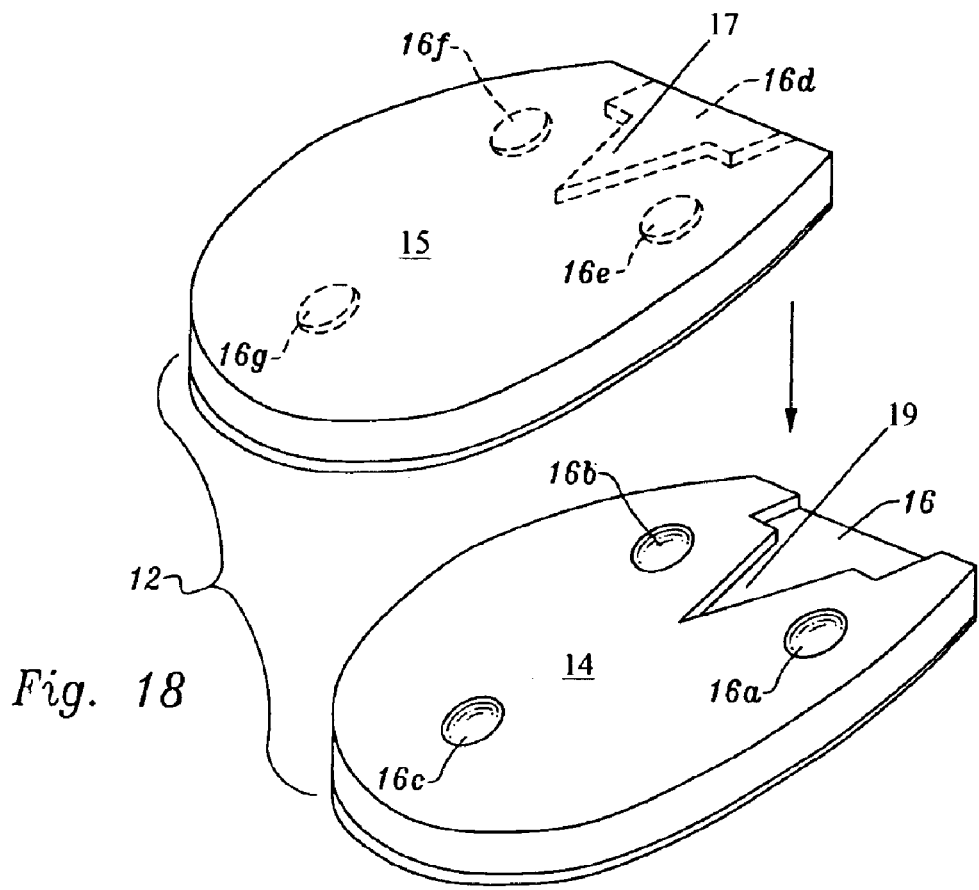
FIG. 18 is an exploded view of an insert shown with the tri-lock interlocking mechanism of FIG. 17 prior to its engagement into the mid-sole mechanism of the hoof-ware system.

Viewing FIGS. 1, 17 and 18, it can be seen that in one embodiment the equine hoof-ware 10 includes an interlocking means 12 comprised of three triangularly spaced complementary protrusions 16e, 16f, 16g and indentions 16a, b and c pairs disposed on the removable insert 15 and the mid-sole 14 for receiving and interlocking the two together such that the removable insert can be inserted and then removed and replaced with a different removable insert, for treating different equine hoof related ailments.

The equine hoof-ware interlocking means 12 is further comprised of a rectangularly shaped complementary protrusion 16d and indention 16 pair disposed at a back end on the removable insert 15 and the mid-sole 14 for receiving and interlocking the two together such that the removable insert can be inserted and then removed and replaced with a different removable insert, for treating different equine hoof related aliments.

The equine hoof-ware interlocking means 12 is further comprised of a triangularly shaped complementary protrusion 17 and indention 19 disposed proximate the back ends of the removable insert 15 and the mid-sole 14 at a location surmounting said rectangularly shaped complementary protrusion and indention pair for receiving and interlocking the two together such that the removable insert can be inserted and then removed and replaced with a different removable insert for treating different equine hoof related aliments.

The equine hoof-ware front upper 6 is further comprised of a front section and side sections which upwardly extend from said sole 4 and mid-sole 14 at an angle and terminates into the upper edge 70 which angles downwardly from said forward most end to said rearward most end of the sole 4 such that the side sections of upper 6 taper from the forward most end to the rearward most end of the sole 4 for substantially covering a forward region and side regions of the equine hoof received therein.

The equine hoof-ware further includes at least one stretch insert 72 integrally formed with at least one of the side sections of the front upper 6 for stretching and accommodating hoof size variations (FIG. 1).

More specifically, and viewing FIG. 1, the equine hoof-ware 10 is further comprised of sole 4 having a base extending from a forward most end to a rearward most end of the sole 4, mid-sole 14 disposed on a top of sole 4, and peripheral wall 5 connecting to the base of the sole 4 and including a cross sectional area upwardly slopping from the rearward most end of the sole 4 and then downwardly sloping for providing a relief area and then upwardly slopping to the forward most end of the sole 4 such that when the peripheral wall 5 is compressed the cross sectional area absorbs equine impact. A front upper 6 is provided and is connected to the peripheral wall 5 and interiorly circumscribes a forward most end and sidewalls of peripheral wall 5 for defining an opening 118 for receiving an equine hoof into the front upper 6 and onto the mid-sole 14 and/or insert 15, and thus onto sole 4. The front upper 6 extending upwardly from the mid-sole 14 at an angle and terminating into upper edge 70 which angles downwardly from the forward most end to the rearward most end of the sole such that the front upper tapers from the forward most end to the rearward most end of the sole 4 for substantially covering a forward region and regions of the equine hoof received therein. Contoured back upper 8 is also disclosed and is comprised of a lower section operatively coupled to the rearward most end of the sole 4, upwardly extending bulb section 128 integrally formed with the lower section and shaped to receive an equine bulb of a heel, and the pair of extensions 226 integrally formed with the upwardly extending bulb section for wrapping around the front upper 6. Means are also provided for coupling the pair of extensions 226 to the front upper 6 such that when the equine hoof is received into the front upper and onto the mid-sole 14 and/or insert 15, and thus onto sole 4, when the pair of extensions are coupled to the front upper 6, the equine hoof is essentially surrounded and secured within the equine hoof-ware.

Peripheral wall 5 includes a trim line 122 that traverses wall 5 from its forward most end to its rearward most end. An upper trim or edge 70 is also provided and is preferably formed from leather or a similar acceptable type material which in turn, connects via stitching or adhesive (as is well known in the art and disclosed by the present invention) with inwardly shown reinforced power frame 224 (shown in phantom). The front upper 6 pulls over the front hoof wall and is connected by hook and loop attachment 116 to the back 8, which is preferably formed from stretchy neoprene material. A hook and loop stretch strap 226 wraps around the hoof-ware front upper 6 from the outside and/or inside and/or vice versa. The strap 226 is held in place with a Velcro or similar type adhesive material to securely hold the straps in place, even when exposed to normal and abnormal stress and forces.

Figure 2:
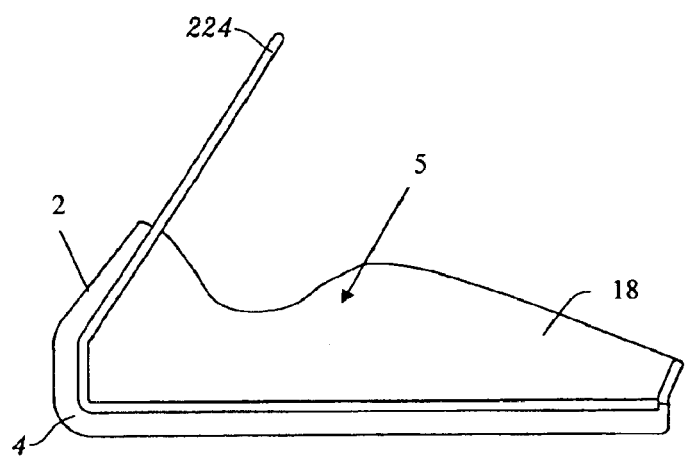
FIG. 2 is a side view of a hoof-ware sole device.

Viewing the individual details of the component parts of the present invention, FIG. 2 shows details of the bottom sole 4 attached to peripheral wall 5 circumscribing contoured mid-sole 14 with reinforced power frame 224 juxtaposed between sole 4 and mid-sole 14.

Figure 3:
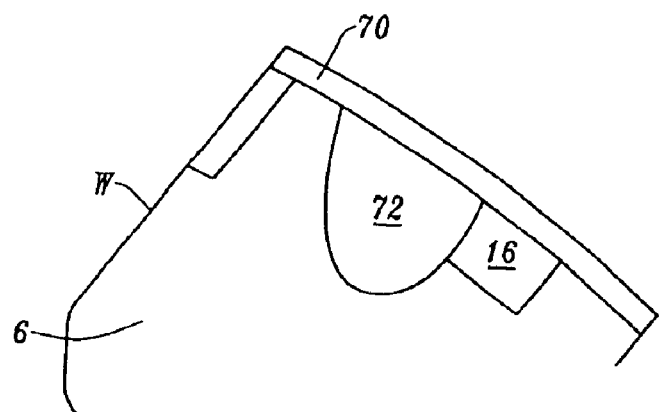
FIG. 3 is a side view of a hoof-ware upper device.

FIG. 3 discloses the front upper 6 which resides interior of the front Wall W and which is designed to form to horse hoof contours. i.e., the front upper 6 includes at least one stretch insert 72 integrally formed with at least one of the side sections of the front upper 6 such that the hoof-ware system 10 adjusts to all hoof shapes and sizes and attaches to the mid-sole 2, and sole 4 via stitching or adhesive as is well known in the art and as is informed by the present invention.

Figure 4:
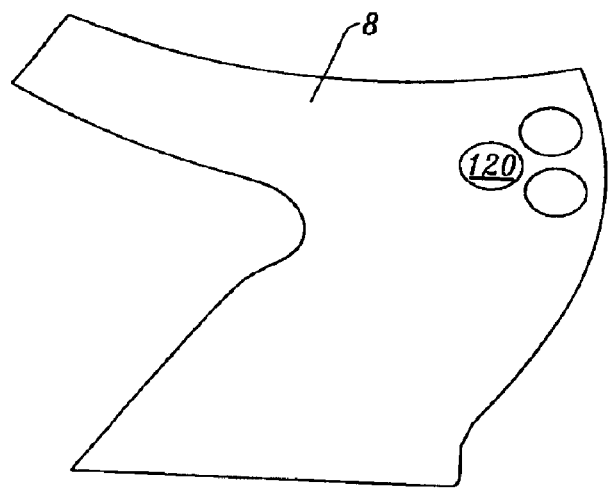
FIG. 4 is a side view of a hoof-ware contoured rear device.

FIG. 4 shows details of contoured back 8 which wraps around the bulb of the heel of a hoof and attaches forward around the front of hoof. At least one hole 120 is provided on the back 8 for example, providing through air flow.

Figure 5:
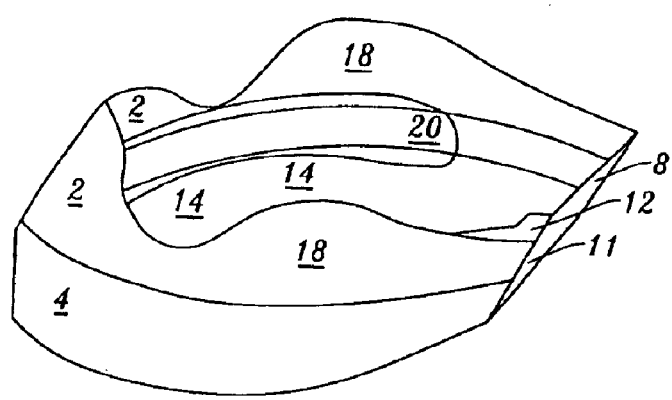
FIG. 5 is a downward perspective side view of the hoof-ware sole connected to the mid-sole, and contoured upper sole.

The details of the interior of the hoof-ware sole 4 connection to a shock absorbing mid-sole section or a contoured mid-sole section 14 and to peripheral wall 5 including contoured upper 2 having a height range of ½ an inch to 3½ inches are shown in FIG. 5. The peripheral wall 5 includes dual angled sole sidewalls 18 having a lower angle of 90 degrees to 160 degrees and an upper angle which varies from 90 degrees to 30 degrees. The shock absorbing mid-sole section or insert 14 has a varied derometer from 20 A to 90 D which provides a vented air flow base. Alternatively, both a single and dual density are provided at contoured mid-sole section or insert 14 with a hoof bracket 20 residing therebelow and traversing laterally across section 14 thereby causing reinforced outer hoof stability. Back 8, operatively connected to the sole 4, mid-sole 14, varies from 90 degrees to 30 degrees and includes a drainage system 11 for the through entry and departure of solutions of sorts. Residing abut against the mid interior portion of back 8 and bordered on each side by the shock absorbing mid-sole section 14 and dual angled side wall 18 of peripheral wall 5, is a tri-lock insole interlocking system/device 12 to be used for holding inserts in place, to be discussed hereinafter.

Figure 6:
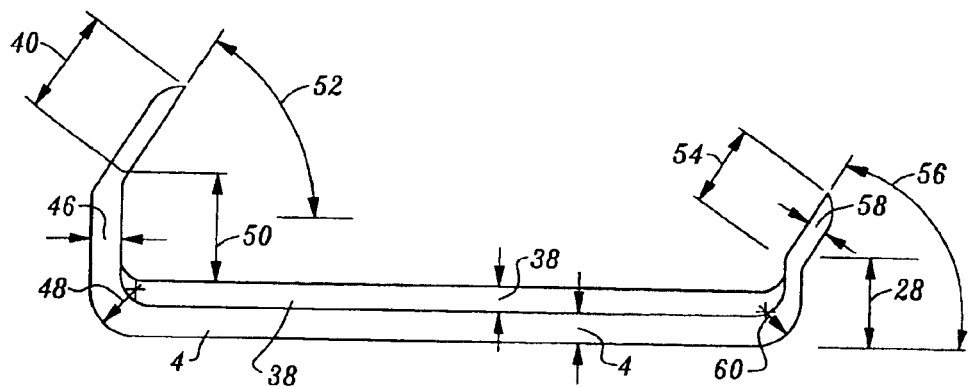
FIG. 6 is a side view of the hoof-ware sole cross-section profile front to back.

FIG. 6 is side view of the hoof-ware sole 4 taken in cross-section and profiling the dimensions of the device, front to back, sole 4 has a range of 1.0 to 15.0 millimeters thickness, front to back 52, a range of 76.0 millimeters to 350 millimeters, front bend or corner 48 of sole 4 is 5.0 millimeters to 30.0 millimeters, a front sole 4 rising up 50 has a range of 10.0 millimeters to 50.0 millimeters, thickness 46 has a range of 1.0 millimeters to 10.0 millimeters, a top thickness range of 1.0 to 10.0 millimeters 40 and length of angle range 0.0 millimeters to 50 millimeters, angle 42 embodying a range of 45 degrees to 65 degrees 42, back bottom bend or corner 60 has a range of 0.0 millimeters to 30 millimeters, 28 to back device bend 58 has a range of 1.0 millimeters at 10.0 millimeters in length at top of sole back 58, range degree 56 angle ranging from 45 degrees to 90 degrees, mid-sole inset 38 has a range of 1.0 millimeters of 10.0 millimeters.

Figure 7:
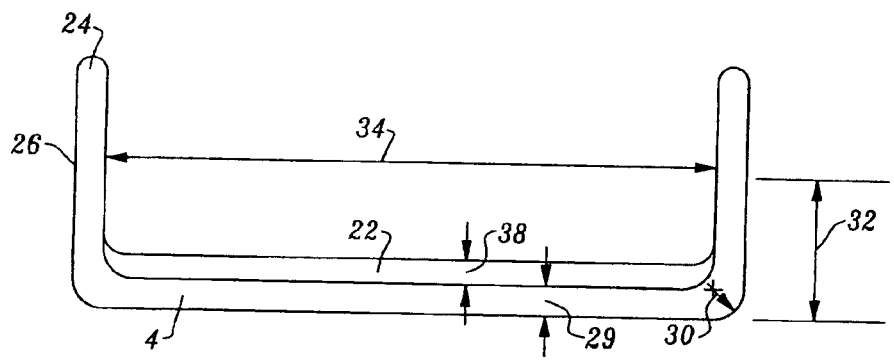
FIG. 7 is a side view of the hoof-ware sole cross-section profile side to side.

FIG. 7 is a side view of hoof-ware sole 4 taken in cross-section profiling from side to side the dimensions of mid-sole insert 38 which has a range 1.0 millimeters to 10.0 millimeters thickness, sole 4 bottom thickness 29 has a range of 1.0 millimeters to 15.0 millimeters, corner or bend of sole and mid-sole thickness range of 0.0 millimeters to 30.0 millimeters, side height 32 has a range of 10.0 millimeters to 50.0 millimeters, front sole thickness 26 has a range of 1.0 millimeters to 10.0 millimeters, top thickness 24 has a range of 1.0 millimeters to 10.0 millimeters, interior side to side length 34 has a range of 64.0 millimeters to 350.0 millimeters.

Figure 8:
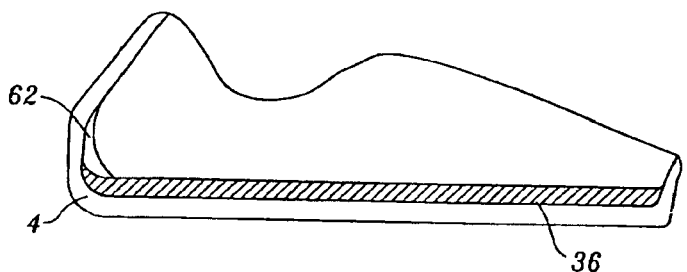
FIG. 8 is a side view of the hoof-ware sole section.

FIG. 8 is a side view of the hoof-ware sole section of sole 4 showing its range of thickness of 1.0 millimeters to 15.0 millimeters for an internal reinforcement strip 62 with a range of thickness of 1.0 millimeters to 10.0 millimeters for an alternative embodiment molded mid-sole 36 which embodies combinations of multiple materials as the construction composites, such as, EVA, rubber compounds, polyethylene, silicon, sorbothane, polymers, and other similar materials resulting in a hoof-ware device that has utilities of flex, cushion, shock absorption, medicinal applications, performance applications, use in diagnostic situations, for stimulation and/or corrective purposes, emergency situations, and/or rehabilitation of the hoof.

FIG. 9 is a side view profile of peripheral wall 5.

FIG. 10 is a top plan view of hoof-ware mid-sole 14 showing a range of 64.0 millimeters to 350.0 millimeters 74 when the dimensions is taken from side to side, and 76.0 millimeters to 350.0 millimeters 76 when the dimensions are taken from front to back.

FIG. 11 is a side view of an alternative embodiment of hoof-ware sole 4 connected to a mid-sole 38, connected to sidewall 18 (shown in section) and upper 6. Sole 4 and mid-sole 38 are of a contoured shape for correct movement and break over with variable thickness for support and wear which are desirable for proper hoof maintenance. It is to be noted that multiple sole 4 designs for grip and wear have been established by horse breeders and are taught by the disclosure herein such that angled wall 40 is angled to conform to a hoof, and interior wall 62 is configured to bracket the hoof, and tapered side edge 64, interposed between mid-sole 38 and upper 6, is configured to blend with upper material 6 to contour with the hoof providing breathable materials that are angled upper from front to back as shown by 70 from 45 degrees to 90 degrees. A Velcro hook or connection 68 connects to back section 8, padded trimmed upper 70, stretch insert 72 and front upper 6 and is used for accommodating hoof size variations, including angled back 8 to contour with the hoof heel shape that is 45 degrees to 90 degrees.

Figure 12:
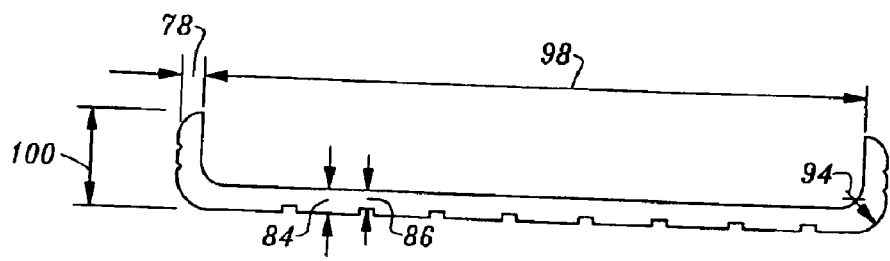
FIG. 12 is a sidewall diagram of the hoof-ware sole, side to side.

FIG. 12 is a sidewall diagram of the hoof-ware sole 4, without mid-sole 38, shown in a side to side view, this embodiment of sole 4 at end of sole protruded rubber 84 there is shown a range of 1.0 millimeters to 15.0 millimeters, and a range of 1.0 millimeters to 12.0 millimeters at inside of protruded rubber 86, corner or bend 94 has a range of 0.0 millimeters to 30.0 millimeters upper wall width has a range of 1.0 millimeters to 10 millimeters 78, front height has a range of 10.0 millimeters to 50.0 millimeters 100, embodying and resulting in a thickness of 1.0 millimeters to 10.0 millimeters, and a length range from side to side of 76.0 millimeters to 350.0 millimeters 98.

Figure 13:
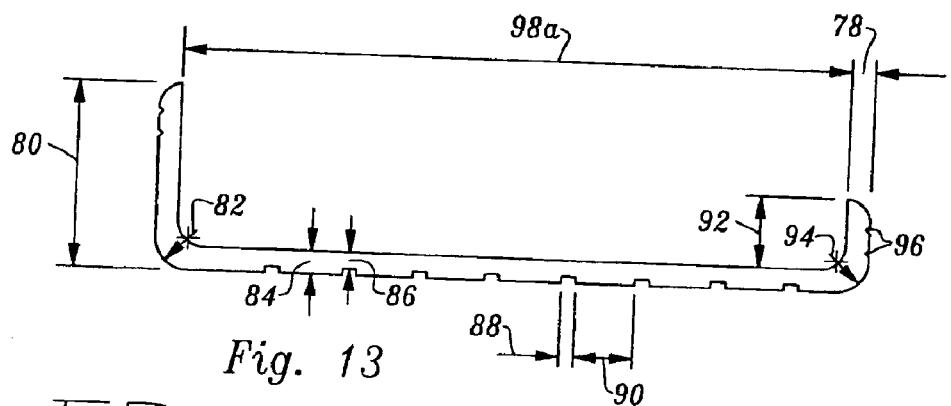
FIG. 13 is a sidewall diagram of the hoof-ware sole, front to back.

FIG. 13 is a sidewall diagram of the hoof-ware sole 4 front to back, with a range length of 76.0 millimeters to 350.0 millimeters 98a, front range of 10.0 millimeters to 50.0 millimeters 80, a top thickness range of 1.0 millimeters to 10.0 millimeters 78, corner or bend in front range of 0.0 millimeters to 30.0 millimeters 82, back height 92 range of 10.0 millimeters to 50 millimeters, back corner or bend 94 range 0.0 millimeters to 30.0 millimeters, and two grooves 96 for stitching.

Figure 14:
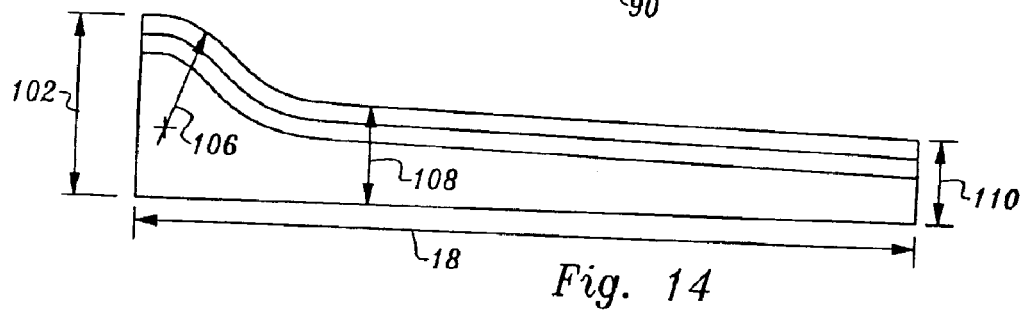
FIG. 14 is a sidewall diagram of the hoof-ware contour design.

FIG. 14 is a view of the sidewall 18 profile of the hoof-ware contour design, height range of 10.0 millimeters to 50.0 millimeters 102, with a beginning angle height of contour 106 range 20.0 millimeters to 50.0 millimeters a mid-angle height range of 10 millimeters of contour 108 to 50 millimeters. End contour design range 110 extending 10 millimeters to 50 millimeters.

Figure 15:
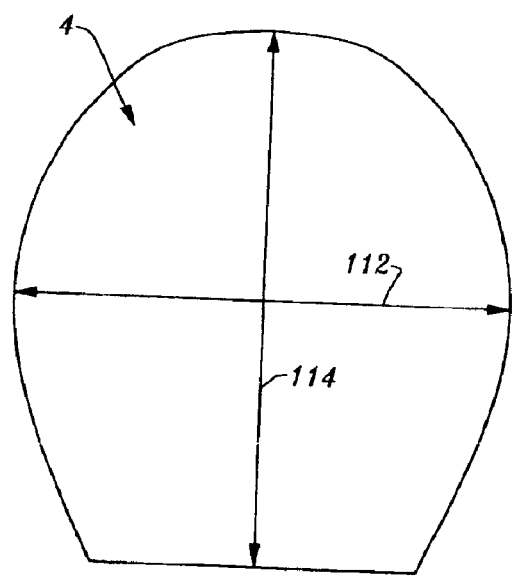
FIG. 15 is a diagram of the hoof-ware interior sole dimensions.

FIG. 15 is a top plan view of the hoof-ware interior sole 4 dimensions, with a range of 64 millimeters to 350.0 millimeters side to side 112, and with a range of 76.0 millimeters to 350 millimeters front to back 114.

Figure 16:
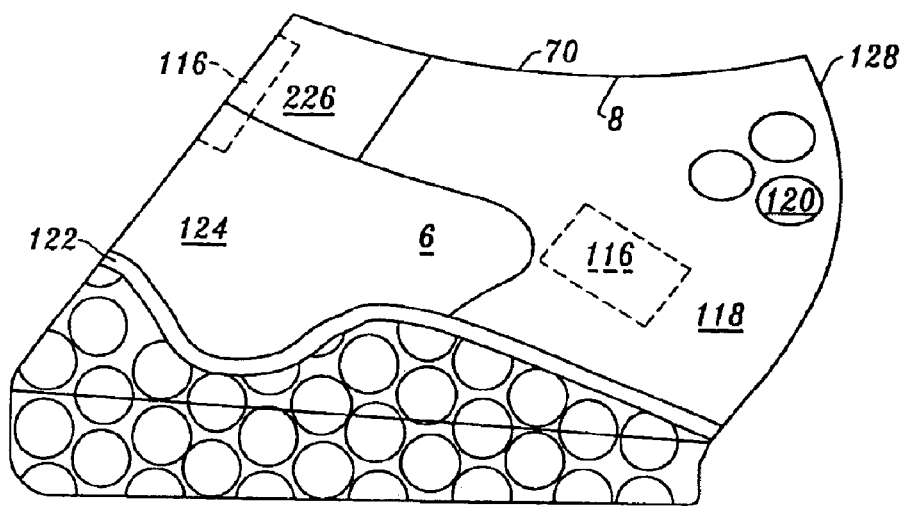
FIG. 16 is a side view of the hoof-ware contoured back attached to the front upper, mid-sole and sole.

FIG. 16 is a side view of the hoof-ware contoured back 8, contoured to be shaped in a manner that is upward of the hoof to fit the shape of a hoof wherein the lower leg is held in place by the front upper sleeve 6 and, in this embodiment, mid-sole 38 and sole 4. The contoured padded trim or collar 70 is operative coupled to the upper 6 and includes stretch material, bonded to the trim line 122, and adhered with adjustable wrap-around strap 226 which embodies an attachment system using hook and loop and attachment 116, for example, or other latching devices. The contoured upper front receiving section 118 is shaped to fit a hoof and vented to allow air flow at 124, via hook and loop strip for back attachments 116 which ultimately are contoured to back heel cover 128, which also provides for a vented back with breathable backing holes 120.

FIG. 17 is a top plan view diagramming the dimensions of an embodiment of an insert 15 and tri-lock interlocking mechanism 12 and wherein insert 15 can be comprised of multiple materials, shapes, densities, designs, colors, diagnostics, evaluation components, air flow venting, and providing an insert 130a of multiple hoof sizes front to back having dimensions sizing range 3 inches to 12 inches, shown by line demarcation 130b, side to side sizing range 2½ inches to 12 inches, shown by line demarcation 130c, bottom right side circular interlock 16e, shown by line demarcation 132a has a range ¼ inch to 1 inch diameter, bottom left side circular interlock 16f, shown by line demarcation 132c has a range ¼ inch to 1 inch diameter. Circular interlock 16g, shown by line demarcation 132b may have a range ¼ inch to 1 inch diameter, tri-lock locking system for pads 132, tri-lock attachment to sole 134, back of sole perpendicular lock 132d, being ½ inch, back of sole to tip point of triangle 132e, being 2.4 inches, bottom of triangle 132f, being 1½ inches, perpendicular bottom of triangle 132g is a ½ inch by 2 inches.

FIG. 18 is a top and side plan view of an embodiment of mid-sole 14 and removable insert 15 including interlocking means 12. Part of the interlocking means 12 is embodied to the mid-sole 14 thereby being embodied to the sole 4, and includes a tri-lock inset 16 interlocking with and complementing tri-lock device 16d, tri-lock mechanism 16a interlocking with tri-lock mechanism 16e, tri-lock mechanism 16b interlocking with tri-lock mechanism 16f, and tri-lock mechanism 16c interlocking with tri-lock mechanism 16g.

Figure 19:
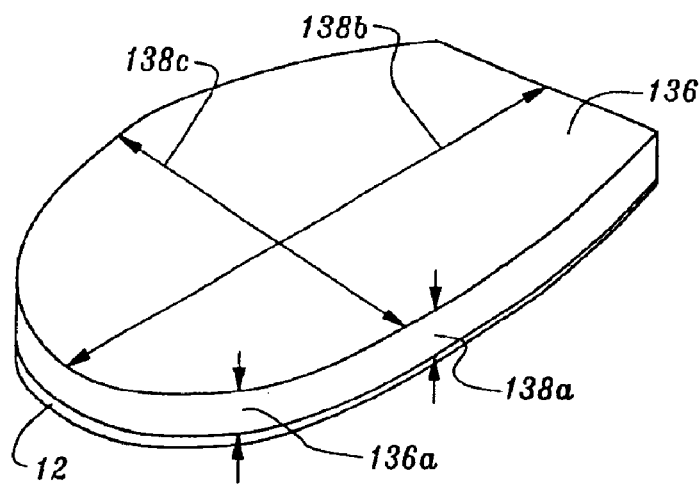
FIG. 19 is a top and side plan view of a single density flat insert already engaged with the tri-lock interlocking mechanism of FIG. 17.

FIG. 19 a top and side plan view of an alternative embodiment of an insert and particularly a single density flat insert 136 into hoof-ware device with tri-lock interlocking mechanism 12, height (136a) range ¹⁄₁₀ inch to 2 inches, comparable densities (138a) range 1 to 100 on the A derometer scale and/or 1 to 100 on the C derometer scale embodying combinations of multiple materials construction composites, EVA, rubber compounds, polyethylene, silicon, sorbothane, polymers, and other similar materials embodying utilities of flex, cushion, shock absorption, medicinal, performance, diagnostic, stimulation, correction, emergency, and/or rehabilitation environments.

Figure 20:
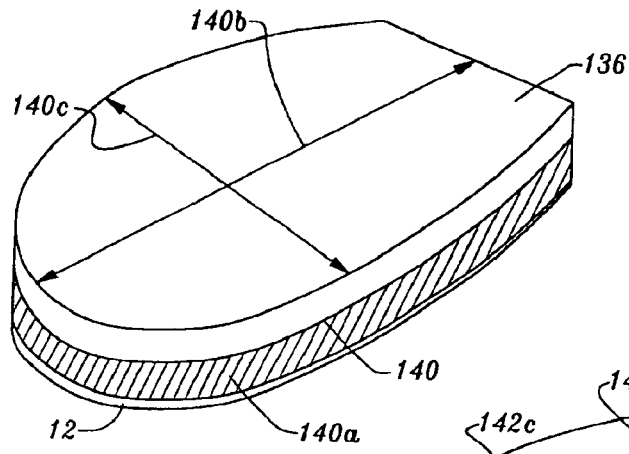
FIG. 20 is a top and side plan view of a flat multi-density insert already engaged with the tri-lock interlocking mechanism of FIG. 17.

FIG. 20 is a top and side plan view of an alternative embodiment of insert and particularly the flat single-density insert 136 into hoof-ware device with tri-lock interlocking mechanism 12, and used in combination with a multi-density flat insert 140, thereby resulting in a multi-density insert, which when viewed from side to side 140c has a range of 2.5 inches to 12 inches, and front to back 140b has a range of 3.0 inches to 12 inches, and multi-density compound 140a and preferably with two or more combinations of parts of EVA, polyethylene, polyurethane, silicon, sorbothane, polymers, composites and/or similar materials consisting of C scale of 1 to 100 and/or A scale of 1 to 100 and/or 0 scale 1 to 100.

Figure 21:
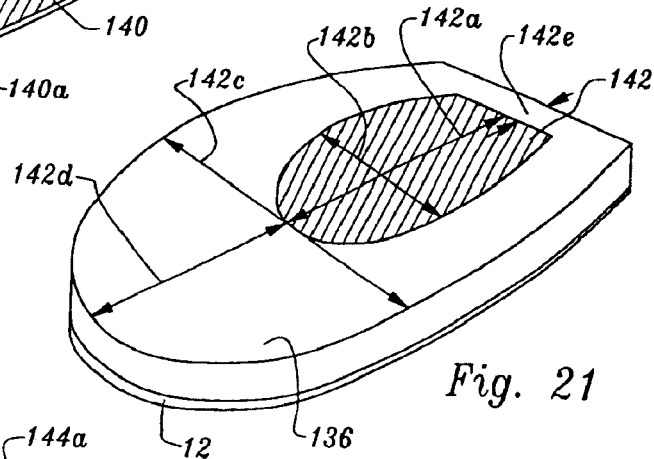
FIG. 21 is a top and side plan view of a multi-compound flat insert already engaged with the tri-lock interlocking mechanism of FIG. 17.

FIG. 21 is a top and side plan view of an alternative embodiment and particularly a multi-compound flat insert into hoof-ware device with tri-lock interlocking mechanism 12, flat insert 136 is altered by a multi-compound insert into insert 142 composed, preferably of, single or multiple combinations EVA, polyethylene, polyurethane, silicon, sorbothane, polymers, composites and/or similar materials, front to back 142a is ½ inch back from mid-point side to side, or to 0.0 inches, side to side 142b has a range to ½ inch right side and/or left side, whereas the insert side to side 142c has a range of 2.5 inches to 12 inches, a front of insert 136 to the front of multi-compound insert 142 has a range of 3.0 inches to 6.0 inches, back of multi-compound insert 142e to back of insert 136 is ½ inch.

Figure 22:
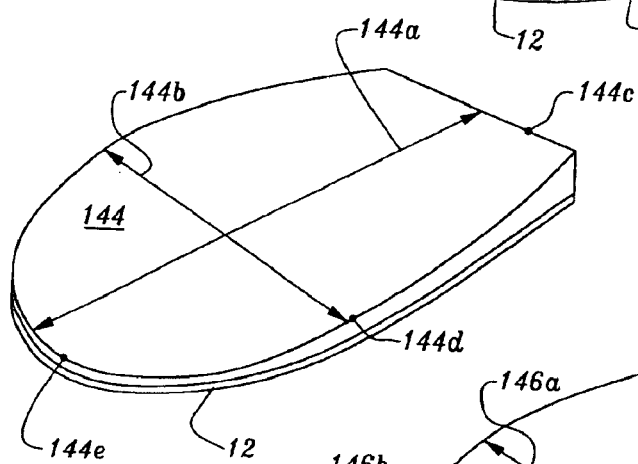
FIG. 22 is a top and side plan view of a wedge single density insert already engaged with the tri-lock interlocking mechanism of FIG. 17.

FIG. 22 is a top and side plan view of an alternative embodiment single density wedge insert 144 for placement into hoof-ware device with tri-lock interlocking mechanism 12, single density wedge insert 144 includes combinations of compounds of EVA, polyethylene, polyurethane, silicon, sorbothane, polymers, composites and/or similar materials. Insert 144 has a dimensional range, front to back 144a of 3 inches to 12 inches, from side to side 144b of 2.5 inches to 12 inches, from the back of wedge insert height 144c varying in range from 2 inches to ⅒th inch, and an angle range of 0 degrees to 35 degrees, wherein the front of wedge insert height 144e is ⅒ inch. It is to be noted that wedge insert 144 embodies multiple configurations at multiple points.

Figure 23:
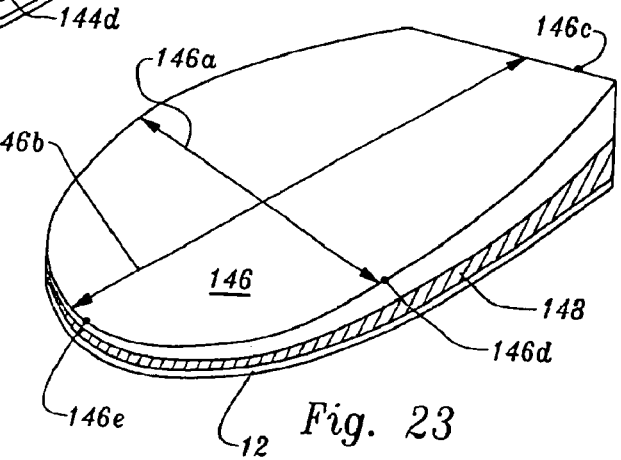
FIG. 23 is a top and side plan view of a wedge multi-density insert already engaged with the tri-lock interlocking mechanism of FIG. 17.

FIG. 23 is a top and side plan view of an alternative embodiment of a wedge multi-density insert 146 into hoof-ware device with tri-lock interlocking mechanism 12, with dimensions from side to side, insert 146a of 2½ inches to 12 inches, from front to back, insert 146b) of 3 inches to 12 inches, and a back height of multi-density wedge insert 146c with a range of 0 to 2 inches, with the mid-point if multi-density wedge insert 146 of 0 to 2 inches. The multi-density wedge insert is comprised of one or more compound combinations 148a of EVA, polyethylene, polyurethane, silicon, sorbothane, polymers, composites and/or similar materials, and having a constant insert thickness measurement of 0 to 2 inches, 148b.

Figure 24:
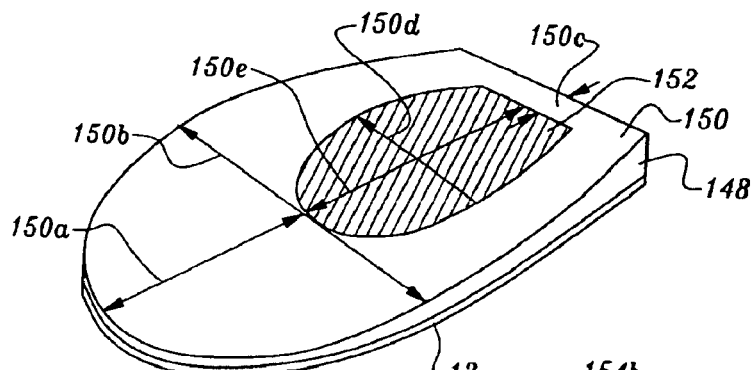
FIG. 24 is a top and side plan view of a multi-compound wedge insert already engaged with the tri-lock interlocking mechanism of FIG. 17.

FIG. 24 a top and side plan view of an alternative multi-compound wedge insert 150 into hoof-ware device with tri-lock interlocking mechanism 12, the multi-compound 148a wedge insert, and wedge indentation insert 152 are combined with an insert front to top of wedge 150a with a range of 3 inches to 6 inches, from back of wedge insert to back of insert 150c of ½ inch to 0.0 inches, from side to side 150b of 2.5 inches to 12 inches, from the top of wedge insert to back of wedge insert 150e, mid-point side to side to 0.0 inches of back of insert, side to side of wedge insert 150d, mid-point side to side of insert to maximum ½ inches on the right side and ½ inches on the left side.

Figure 25:
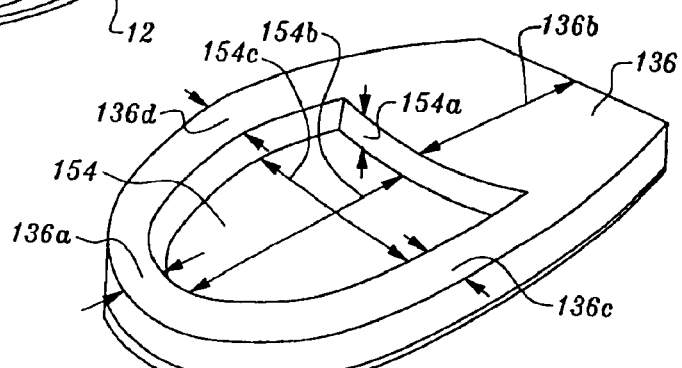
FIG. 25 is a top and side plan view of a flat cutout insert already engaged with the tri-lock interlocking mechanism of FIG. 17.

FIG. 25 a top and side plan view of an alternative cut out 154 of flat insert 136 into hoof-ware device with tri-lock interlocking mechanism 12, top of insert to top of cutout 136a has a dimension of ⅒th inches to 2 inches, back of cutout to back of insert 136b has as dimension of ½ inch to 6 inches, viewing downwardly left side mid-side of insert to mid-side of cutout 136c has a dimension of ½ inches, downwardly right side mid-side of insert to mid-side of cutout 136d ha a dimension of ½ inch, cutout height 154a has a dimension of ⅒th inch to 2 inches, cutout front to back 154b ½ inch to 0 inches, cutout side to side 154c ha a dimension of ½ inch on front and side and side.

Figure 26:
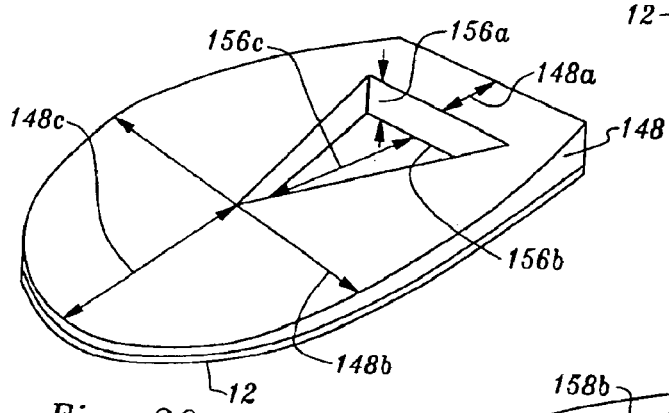
FIG. 26 is a top and side plan view of a wedge cut-out insert already engaged with the tri-lock interlocking mechanism of FIG. 17.

FIG. 26 is a top and side plan view of triangle cut out 156 of wedge insert 148 with tri-lock interlocking mechanism 12, back of triangle cut out to back of Insert 148a bottom of triangle cutout to a inches, side to side of Insert 148b 2½ inches to 12 inches, front to tip of triangle 148c ⅒th inches to 2 inches, height of triangle, cut out 156a ⅒th inches to 2 inches, mid-point side to side triangle 156b maximum of ½ inch from outer side or side, front to back triangle cut out 156c ½ inches back from mid-point side to side 148b to 0 inches.

Figure 27:
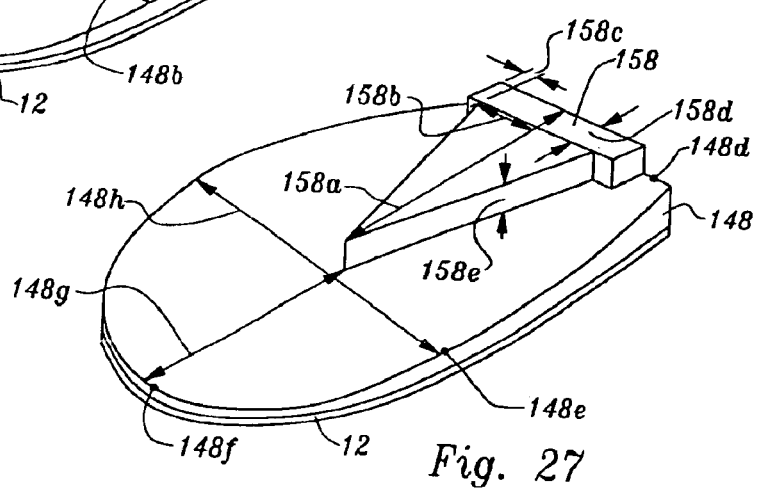
FIG. 27 is a top and side plan view of an add-on attachment for use with any wedge insert and already engaged with the tri-lock interlocking mechanism of FIG. 17.

FIG. 27 is a top and side plan view of add-on triangle attachment 158 to wedge insert 148 into hoof-ware device with tri-lock interlocking mechanism 12, back height of wedge insert 148a ⅒th inch to 2 inches, mid-point height of wedge insert 148b ⅒th inch to 2 inches, front height of wedge Insert 148c ⅒th inch to 2 inches, front of wedge insert to tip 148d of triangle insert 158, 1¾ inches to 7 inches, side to side mid-point of wedge insert 148e 2½ inches to 12 inches, front tip to back of triangle attachment 158a 1¼ inches to 5 inches, base side to side of triangle attachment range 1 inches to 6 inches, width of base from triangle to triangle base 156c ¼ inch to 1 inch, top of triangle base to back of triangle base 158d ½ inches to 1 inches height of triangle attachment 158e.

Figure 28:
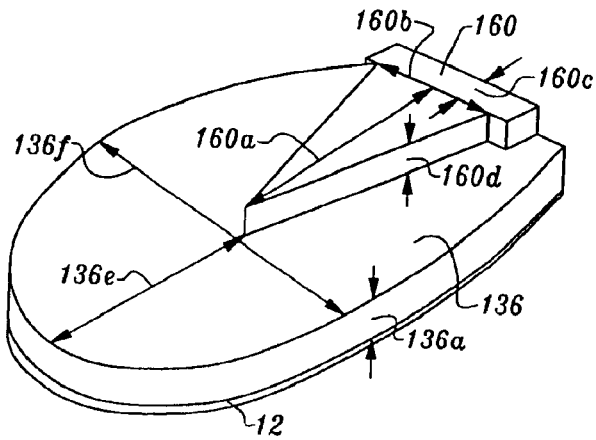
FIG. 28 is a top and side plan view of an add-on attachment for use with a flat insert already engaged with the tri-lock interlocking mechanism of FIG. 17.

FIG. 28 is a top and side plan view of triangle add-on attachment 160 to a flat Insert 136 into hoof-ware device with tri-lock interlocking mechanism 12 with a height of flat insert 136a ⅒th inches to 2 inches, front of flat insert to tip of triangle attachment 136c 1¾ inches to 7 inches, mid-point side to side of flat insert 136b 2½ inches to 12 inches, tip of triangle insert to back of triangle insert 160a 1¼ inches to 5 inches, mid-point side to side of triangle insert 160b 1 inch to 6 inches, width of base from triangle to triangle base 160c ¼ inch to 1 inch, height of triangle attachment 160d ⅒th inches to 2 inches, front to back of triangle base from base of triangle to back of insert 160c.

Figure 29:
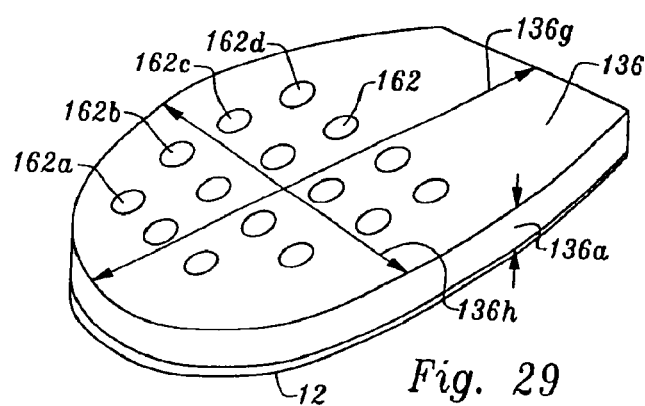
FIG. 29 is a top and side plan view of a perforated flat insert already engaged with the tri-lock interlocking mechanism FIG. 17.

FIG. 29 is a top and side plan view of flat insert 136 with 15 perforated holes 162 into hoof-ware device with tri-lock interlocking mechanism 12 height of flat insert 136a ⅒th inches to 2 inches, front to back of flat insert 136b ½ inch to center point of side to side dimension, midpoint side to side of flat insert 136c 2.5 inches to 12 inches, diameter of each 3–10 holes 162a ¼₄ inches placed ¼ inches inside of edge of insert ranging ½ inch to 1½ inch hole centers, diameter of each 3–22 holes 162b ¼ inches placed ¼ inch inside of edge of insert ranging ½ inch to 1½ inch hole centers, diameter of each 3–22 holes 162c ¼ inches placed ¼ inch inside of edge of insert ranging ½ inch to 1½ inch hole centers, diameter of each 3–22 holes 162d ¼ inches placed ¼ inch inside of edge of insert ranging ½ inch to 1 inch centers.

Figure 30:
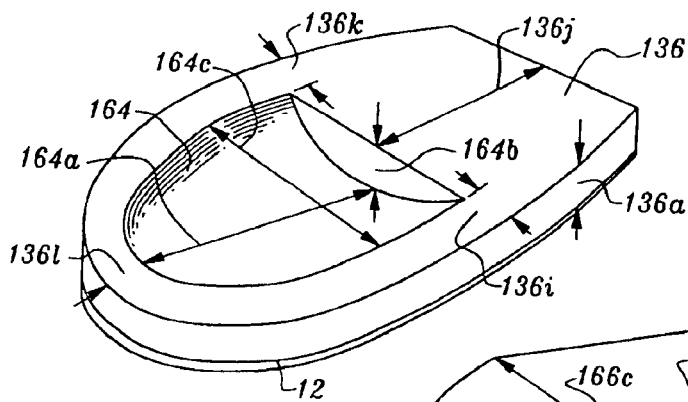
FIG. 30 is a top and side plan view of a concave contour flat insert already engaged with the tri-lock interlocking mechanism of FIG. 17.

FIG. 30 is a top and side plan view of concave contour 164 flat insert 136 into hoof-ware device with tri-lock interlocking mechanism 12 with a height of flat insert 136a ⅒th inches to 2 inches, mid-point side to side of flat insert 136 to outer wall of concave contour 136b ½ inch to center point of side to side dimension, mid-point side to side of flat insert 136 to right side looking downward to outer wall of concave contour 136*d* ½ inch to center point of side to side dimension, back of concave contour 164 to back of flat insert 136*c* range to 0 inches, downwardly look at front of flat insert 136 to front of concave contour 164 is 136*e* ½ inch to center point of side to side dimension, front to back of concave contour 164*a* range of ½ inch to 0 inches, back of concave contour base to height of flat insert 136) is 164*b* range of ¹⁄₁₆th inch from bottom of insert to top of insert, mid-point side to side 164*c* of concave contour multiple ranges from ¹⁄₁₆th inch upward slope to top of insert 136.

Figure 31:
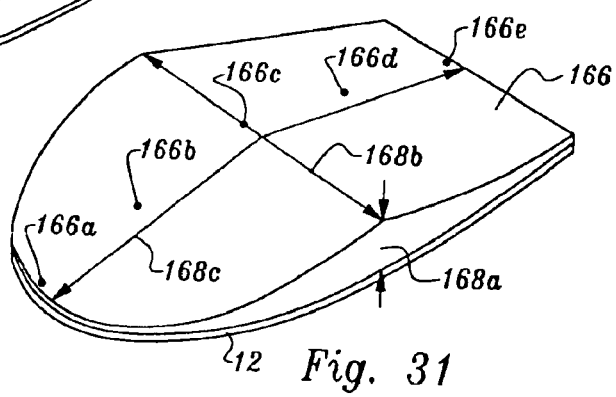
FIG. 31 is a top and side plan view of an angled convex contour insert already engaged with the tri-lock interlocking mechanism of FIG. 17.

FIG. 31 is a top and side plan view of an angled convex contour insert 166 into hoof-ware device with tri-lock interlocking mechanism 12 height of convex contour at mid-point 168*a* ¹⁄₁₀ inches to 2.0 inches, mid-point side to side at convex point 168*b* range 2.5 inches to 12 inches, front to back of convex contour insert 168*c* 3.0 inches to 12 inches, front point of base of convex contour 166*a* ¹⁄₁₀th inch to 2 inches, mid-point front side to side of convex contour 166*b* ¹⁄₁₀th inch to 2 inches, apex of convex side to side 166*c* ¹⁄₁₀th inch to 2 inches, mid-point side to side of back half of convex contour 166*d* ¹⁄₁₀th inch to 2 inches, back point of base of convex contour 166*e* ¹⁄₁₀th inch to 2 inches.

Figure 32:
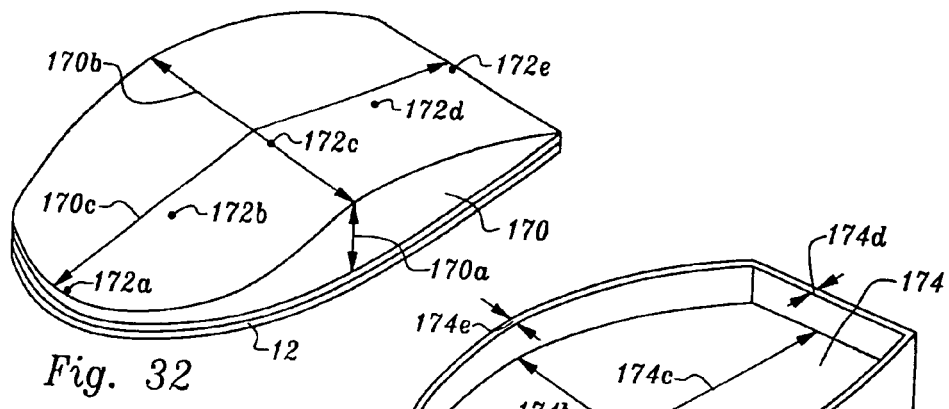
FIG. 32 is a top and side plan view of a rounded convex contour insert already engaged with the tri-lock interlocking mechanism of FIG. 17.

FIG. 32 is a top and side plan view of a rounded convex contour insert 170 into hoof-ware device with tri-lock interlocking mechanism 12 with a height of rounded convex contour 170*a* range ¹⁄₁₀th inch to 2 inches, side to side of rounded convex contour apex 170*b* range 2.5 inches to 12 inches, front to back of rounded convex contour insert 170*c* range 3.0 inches to 12 inches, height front base point of rounded convex contour 172*a* range ¹⁄₁₀th inch to 2 inches, height of mid-point of rounded convex contour 172*b* range ¹⁄₁₀th inch to 2 inches, height of apex of rounded convex contour 172*c* range ¹⁄₁₀th inch to 2 inches, mid-point height back base point of rounded convex contour 172*d* range ¹⁄₁₀th inch to 2 inches, height of base point of back of rounded convex contour 172*e* range ¹⁄₁₀th inch to 2 inches.

Figure 33:
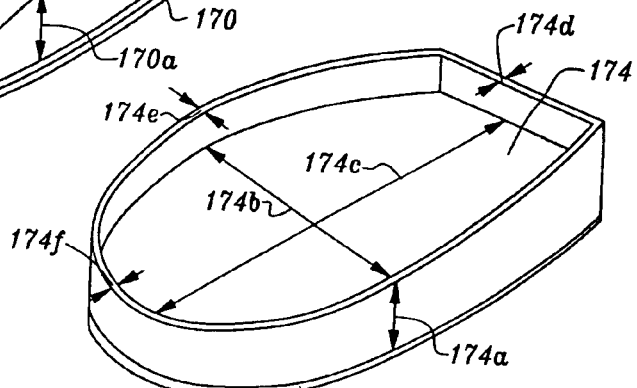
FIG. 33 is a top and side plan view of a sizing insert already engaged with the tri-lock interlocking mechanism of FIG. 17.

FIG. 33 is a top and side plan view of a sizing insert 174 into hoof-ware device with tri-lock interlocking mechanism 12 with a height of insert 174*a* range ¹⁄₁₀th inches to 2.0 inches, exterior side to side of sizing insert 174*b* 2.5 inches to 12 inches, exterior front to back of sizing insert 174*c* 3.0 inches to 12 inches, exterior to interior back wall of sizing insert 174*d* range ¼ inches to 1 inches, exterior to interior right side wall looking downwardly 174*e* range ¼ inches to 1 inches, interior to exterior left side wall looking downwardly 174*g* range ¼ inches to 1 inches, interior to exterior front wall looking downwardly 174*f* range ¼ inches to 1 inches.

Figure 34:
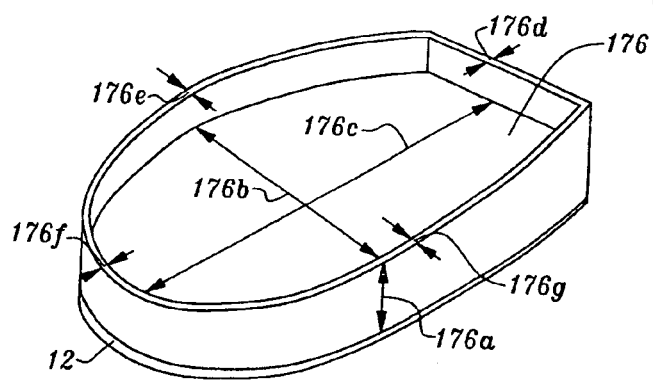
FIG. 34 is a top and side plan view of an impression form insert already engaged with the tri-lock interlocking mechanism of FIG. 17.

FIG. 34 is a top and side plan view of impression form insert 176 into hoof-ware device with tri-lock interlocking mechanism 12, height of impression form insert 176*a* range ¹⁄₁₀th inch to 2 inches, interior side to side of impression form insert 176*b* range exterior walls 2.5 inches to 12 inches, interior front to back of impression form insert 176*c* range exterior 3.0 inches to 12 inches, right side interior to exterior side wall of impression form insert 176*e* range ¹⁄₁₀ inches to 1 inch, back side interior to exterior side wall of impression form insert 176*d* range ¹⁄₁₀ inches to 1 inch, front side interior to exterior side wall of impression form Insert 176*f* range ¹⁄₁₀ inch to 1 inch, left side wall of impression form Insert 176*g* range ¹⁄₁₀ inches to 1 inch.

Figure 35:
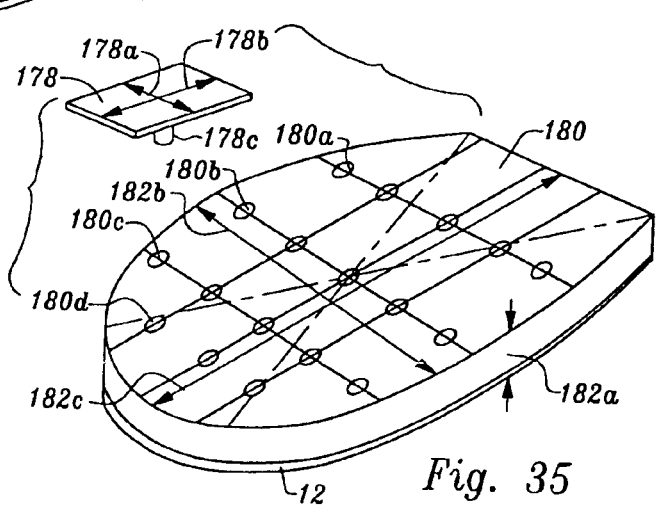
FIG. 35 is a top and side plan view of a mechanical diagnostic insert already engaged with the tri-lock interlocking mechanism of FIG. 17.

FIG. 35 is a top and side plan view of mechanical diagnostic insert 180 with tri-lock interlocking mechanism 12 with a measurement device 180*a* capturing hoof data in back one-half of hoof; capture hoof data in mid-point of hoof 180*b*, capture hoof data in front one-half of hoof; captured front hoof data (180*d*), independent data gathering module 178 device, connecting insert of module device to diagnostic insert 178*c*.

Figure 36:
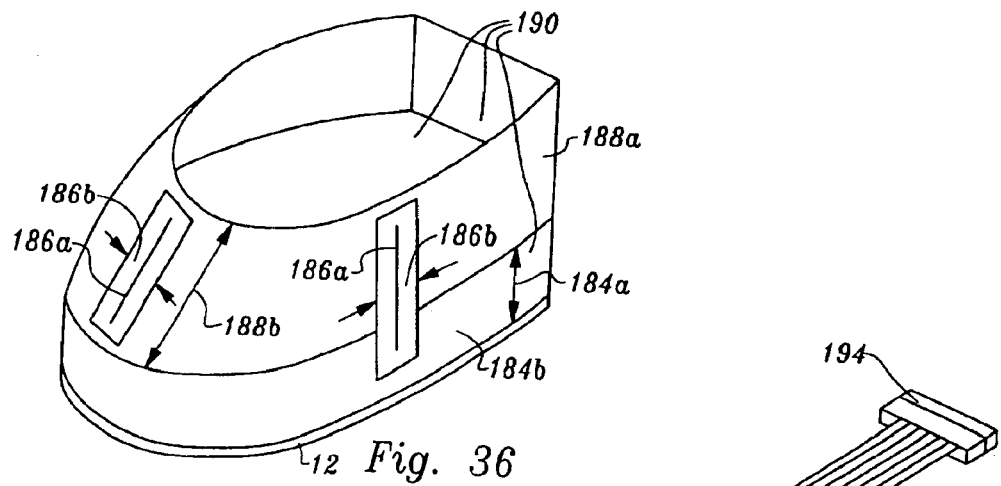
FIG. 36 is a top and side plan view of an x-ray/radiograph liner insert including adjustable wire markers already engaged with the tri-lock interlocking mechanism FIG. 17.

FIG. 36 is a top and side plan view of x-ray/radiograph liner insert 190 into hoof-ware device with adjustable wire markers with tri-lock interlocking mechanism 12 base object for x-ray/radiograph 184*b*, side vertical measuring device 186*a*, width 186*b* configurations vary and may be exactly the same as front vertical measuring device 186*a* and width 186*b* same device attaches to the non-pictured side and back side, height 188*b* from top base in front to top of upper device 188*a*.

Figure 37:
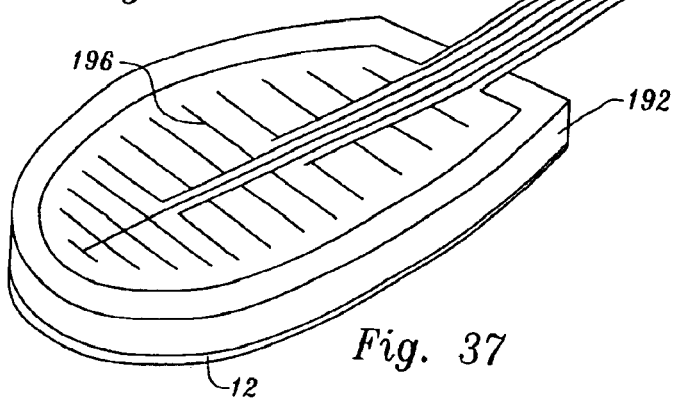
FIG. 37 is a top and side plan view of an electronic diagnostic insert already engaged with the tri-lock interlocking mechanism of FIG. 17.

FIG. 37 is a top and side plan view of electronic hoof insert into hoof-ware device with tri-lock interlocking mechanism 12 comprised of multiple combinations transistors and microprocessors, systems software programmed, applications/analyses programmed and data base driven, hard wire and wireless communications, integrated to pcs to mainframes, collecting-analyzing-decision driven data based on multiple combinations of hoof modes—diagnostics, normal use, performance, corrective, medicinal emergencies, preventative, rehabilitation environments—embodying multiple material combinations construction composites, EVA, rubber compounds, polyethylene, silicon, sorbothane, polymers, and other similar materials and/or densities—embodying one or more C scale range 1 to 100 and/or A scale range 1 to 100 and/or 0 scale range 1 to 100, fitting multiple hoof sizes.

Figure 38:
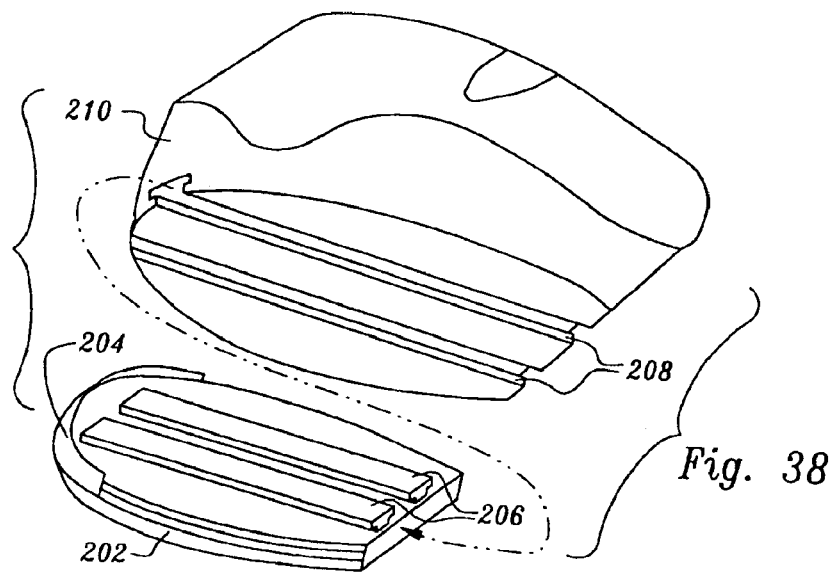
FIG. 38 is a side and interior view of the sole with a slide-locking channel mechanism and an underside view of the hoof-ware device's mid-sole and upper sleeve.

FIG. 38 is a side view of detachable hoof-ware sole 202, hoof-ware device 210, sliding-channels for slide-channel device 206, a front panel 204 with replaceable t-channel slide-locking replaceable channel mechanism 206 with hoof-ware device slide of multiple sizes and shapes conforming to hoof-ware device, fitting multiple combinations hoof mode environments—diagnostics, normal use, performance, corrective, medicinal, emergencies, preventative, rehabilitation—embodying multiple combinations materials construction—composites, EVA, rubber compounds, polyethylene, silicon, sorbothane, polymers, and other similar materials and/or densities embodying one or more C scale ranges 1 to 100 and/or A scale range 1 to 100 and/or D scale range 1 to 100—fitting multiple hoof sizes.

Figure 39:
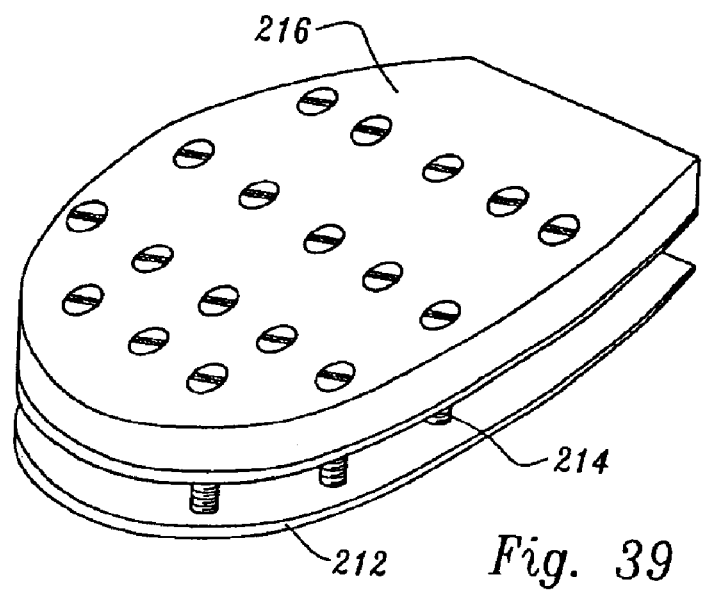
FIG. 39 is a top and side plan view of an adjustable leveling positioning insert device already engaged with the slide-locking channel mechanism of FIG. 38.

FIG. 39 is a side view of adjustable level position insert 216 device into hoof-ware devices with tri-lock interlocking mechanism and/or self-locking devices 212, with minimum of 18 upward-downward, side-to-side, slant-to-slant adjustment devices 214 designed to accommodate minimum of 18 combinations of hoof locations subject to changing and/or combinations of mode environments—diagnostics, normal use, performance, corrective, medicinal emergencies, preventative, rehabilitation—embodying multiple combinations of materials construction—composites, EVA, rubber compounds, polyethylene, silicon, sorbothane, polymers, and other similar materials and/or densities embodying—one or more C scale range 1 to 100 and/or A scale range 1 to 100 and/or 0 scale range 1 to 100, fitting multiple hoof sizes.

Figure 40:
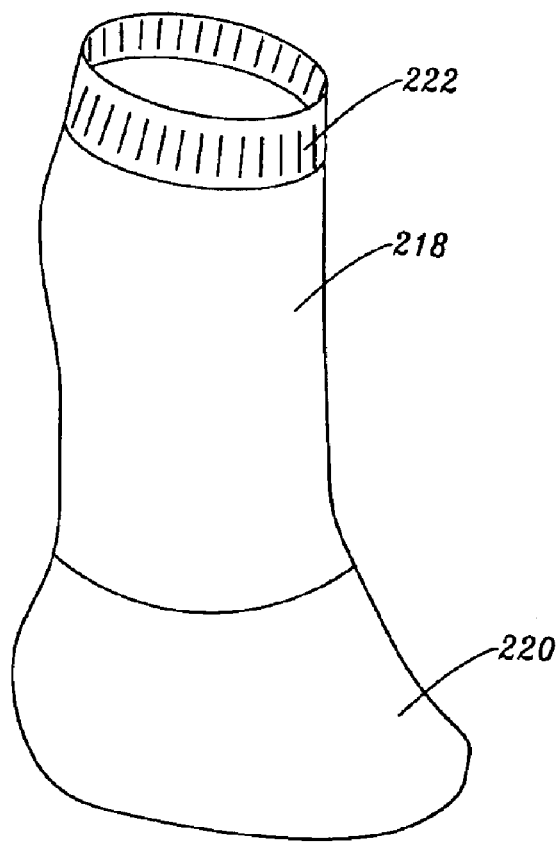
FIG. 40 is a side view of a liner sleeve sock.

FIG. 40 is a side view of liner sleeve sock 220 fitted in and/or over hoof and/or into hoof-ware devices 218, elasticized for snug fitting 222, constructed from liquid shedding materials and/or liquid absorbing materials, changing combinations of mode environments—diagnostics, normal use, performance, corrective, medicinal emergencies, preventative, rehabilitation—size fitting all hooves.

Figure 41:
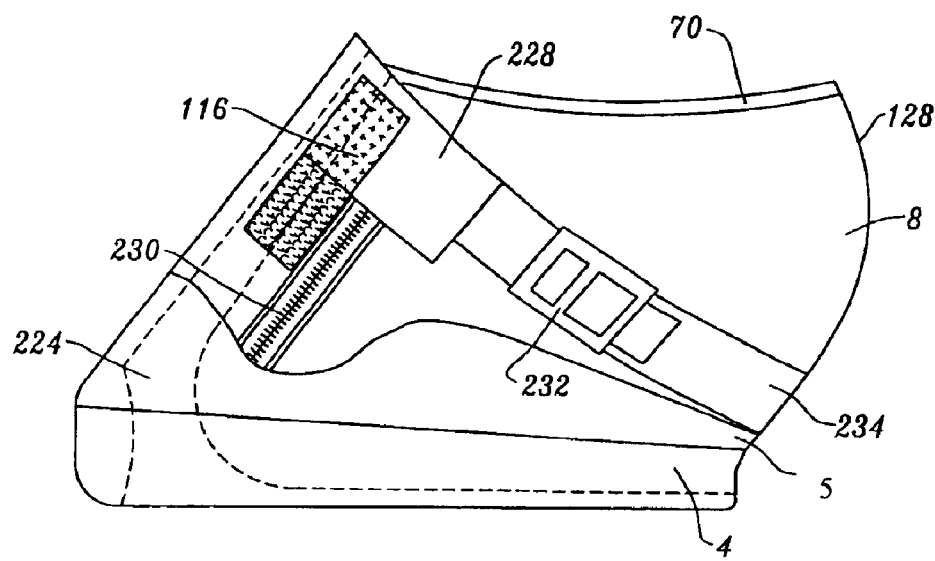
FIG. 41 is a side view of an alternative embodiment of hoof-ware attachment already attached to the hoof-ware device.
Figure 42:
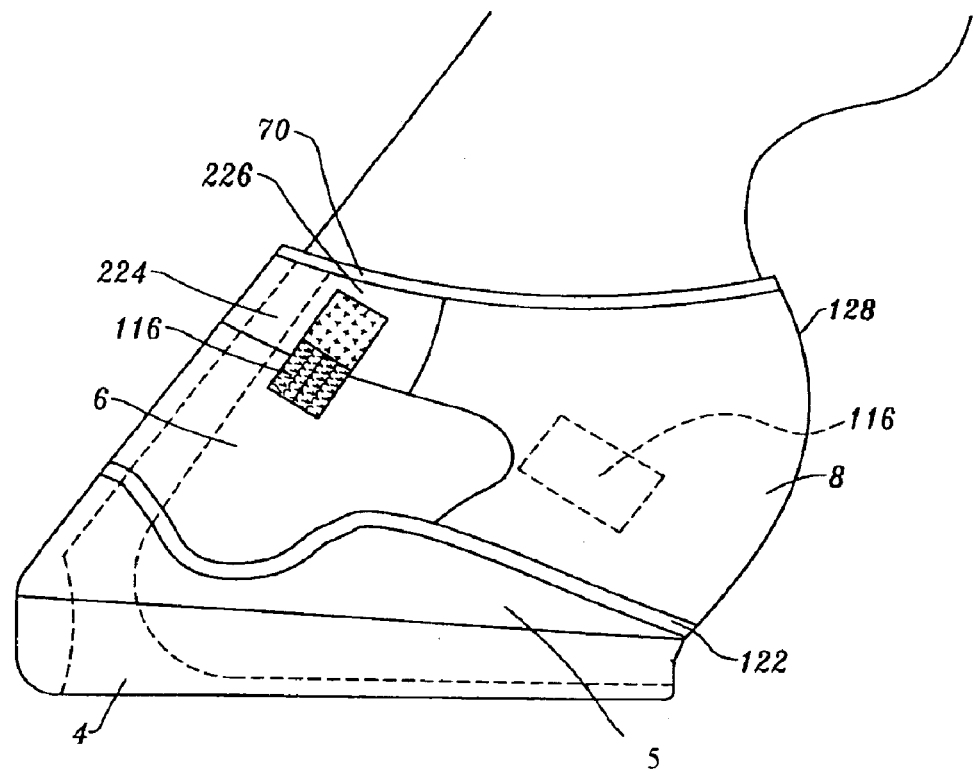
FIG. 42 is a side view of an alternative embodiment of hoof-ware attachment already attached to the hoof-ware device.

FIG. 41 is a side view of an alternative embodiment hoof-ware device showing similar qualities as FIG. 1 and FIG. 42, and other previously descended hoof-ware art, and as taught by the present invention with attachment system 234, sole 4 connected molded to mid-sole 14, attached to upper neoprene 8 contoured back 128, connected to upper leather trim 70, power frame 224 with dotted lines showing non-open view attached to mid-sole 14 and sole 4 and protruding upwardly on front hoof wall with attached hook and loop 116 attached to outside of power frame 224 material, front hoof wall cover device 228 is attached to front mid-sole 14 opened widely in front of hoof-ware device and closed tightly over power frame attached to upper back with metal/plastic zipper 230, further closed tightly with single and/or combination metal or plastic quick release bracket/zipper type buckle attachment 232 that is easily releasable, adjustable and/or ratcheted, connects front hoof wall cover 228 to back strap device 234.

FIG. 42 is a side view of the hoof-ware device showing sole 4, connected to the mid-sole 14, attached to the upper 6 with a trim line 122, attached to the back 8, attached to the back contoured heel cover 128, attached to the upper leather and like materials as upper trim 70, inwardly showing reinforced power frame 224 pulling up over the front hoof wall, connected by book and loop 116 attachment, connected to the back stretchy neoprene material 8, pultruding from the inside pulled outwardly and outside pulled inwardly and/or vice versa as a hook and loop stretch strap (226) wrapping around hoof wall from the outside and/or inside and/or vice versa.

In addition, the equine lightweight versatile hoof-ware 10 comprising an upper 6, a mid-sole 14 a sole 4, embodying multiple inserts is provided. The hoof-ware sole 4 embodying multiple rubber compounds and/or poly/urethane. The hoof-ware 10 is capable of multiple ground engaging equine compression surface configurations including multiple soft, tough, uniquely spaced and integrally formed designs calibrated to equine breeds pointed downwardly below bottom surface of sole 4, wherein said designs, when compressed, will absorb and/or cushion all and/or partial equine impacts during all ground engagements in all healthy environments, said designs fit multiple equine breed's total environment.

Further the sole 4 is uniquely bonded to the mid-sole 14, hoof-ware mid-sole 14 having multiple configurations of polyurethanes, EVA/foam composites, rubber compounds, polyethylenes, silicones, sorbothane, polymers, and other similar materials embodied to flex, cushion, absorb partial and/or all shocks and equine impacts in all ground engagements in all earthly environments.

The hoof-ware upper 6 is uniquely bonded and attached to mid-sole 14 and sole 4, mid-sole 14 comprising multiple stretch and non-stretch fabrics, leathers, embodied wear and/or weather resistant materials designed for all equine environments. The upper embodiments further comprising multiple materials with multiple attachment devices designed for all equine earthly environments.

Moreover, the hoof-ware 10 is configured to embody multiple inserts including, but not limited to normal use, medicinal, correction, rehabilitation, emergencies, performance, and/or preventative. The inserts further embodying all equine hoof related diseases, symptoms and/or lameness designed for: partial and/or all configurations involved in all equine earthly environments. The hoof-ware 10 and/or inserts and/or used together size range is miniature (3 inches front to back, 2.5 inches side to side at mid-point), pony, 000, 00, 0, 1, 2, 3, 4, 5, 6, 7, 8, 9, 10, 11, 12 (12 inches front to back, 12 inches side to side at mid-point), 13, 14.

The hoof-ware configuration, combination and integration of equine hoof-ware device embodying insert devices for purposes of diagnostics, performance, correction, medicinal, emergencies, preventative, rehabilitation and or normal use. Multiple configurations are provided of inserts embodying multiple compounds, densities, cut outs, convex and concave contours, perforations, sizes, add-ons. In addition, inserts are provided, such inserts embodying multiple mechanical devices to comprehensively measure, diagnose, analyze equine hoof configurations. Further, inserts embodying multiple x-ray devices to comprehensively measure, diagnose, analyze equine hoof configurations. In addition, inserts embodying multiple electronic devices to comprehensively measure, diagnose, analyze equine hoof configurations. Moreover, inserts embodying multiple movements of same insert, up and down, side to side, slant to slant, are also provided.

In use and operation, and referring to the drawings, a hoof is to be received within a boot, as shown in FIG. 1, and the hoof is fastened into the boot for ultimate comfort and fit by means of extensions. These extensions wrap and secure the hoof in place and are fastened to at least one fastener which may be located for example at the forward region of the boot. Inserts are also provided in a multitude of designs, shapes, thicknesses, dimensions and material of construction to provide interchangeable inserts such that the boot is not only comfortable and well fitting, but serves many different equine functions. Succinctly, the inserts are used to make the boot acceptable for use for medical purposes, comfort, balance, and protection. Moreover, the hoof-ware of the present invention can be used in many and all environments into an equine may be exposed. Finally, the interchangeable inserts are changed by the equine owner or caretaker such that one boot may be used for multiple sizes of hooves, and many purposes and functions of the equine.

Moreover, having thus described the invention, it should be apparent that numerous modifications and adaptations may be resorted to without departing from the scope and fair meaning of the present invention as set forth hereinabove and as described hereinbelow by the claims.

We claim:

1. Equine hoof-ware, comprising in combination:
   a sole having a base circumscribed by a peripheral wall defining a receiving area;
   a mid-sole received within said receiving area and circumscribed by said peripheral wall;
   a removable insert, and
   an interlocking means integrally formed with said mid-sole and with said removable insert for receiving and interlocking said two together such that said removable insert can be inserted and then removed and replaced with a different removable insert for treating different equine hoof related ailments.

2. The equine hoof-ware of claim 1 wherein said interlocking means is comprised of at least one complementary protrusion and indention pair for mating and interlocking said removable insert and said mid-sole together such that said removable insert can be inserted and then removed and replaced with different removable inserts for treating different equine hoof related aliments.

3. The equine hoof-ware of claim 1 wherein said peripheral wall includes an upwardly and inwardly extending forward most end, an upwardly and outwardly extending rearward most end, and a pair of spaced apart upwardly extending sidewalls interposed between said forward most end and said rearward most end of said peripheral wall for defining said receiving area.

4. The equine hoof-ware of claim 3 further including a front upper connected to said sole and circumscribing said forward most end and said pair of sidewalls of said sole for defining an opening for receiving an equine hoof into said front upper and onto said mid-sole and sole.

5. The equine hoof-ware of claim 4 wherein said front upper extends upwardly from said sole and mid-sole at an angle and terminates into an upper edge which angles downwardly from said forward most end to said rearward most end of said sole such that said front upper tapers from said forward most end to said rearward most end of said sole for substantially covering forward and side regions of the equine hoof received therein.

6. The equine hoof-ware of claim 5 further including a contoured back upper comprised of a lower section operatively coupled to said rearward most end of said sole, an upwardly extending bulb section integrally formed with said lower section and shaped to receive an equine bulb of a heel, and a pair of extensions integrally formed with said upwardly extending bulb section for wrapping around said front upper.

7. The equine hoof-ware of claim 6 further including means for coupling said pair of extensions to said front upper such that when said equine hoof is received into said front upper and onto said mid-sole and sole and when said pair of extensions are coupled to said front upper the equine hoof is essentially surrounded and secured within the Equine hoof-ware.

8. The equine hoof-ware of claim 7 wherein said upwardly extending bulb section includes a vented back comprised of breathable backing holes for providing through air flow.

9. Equine hoof-ware, comprising in combination:
a sole having a base circumscribed by a peripheral wall defining a receiving area;
a mid-sole received within said receiving area and circumscribed by said peripheral wall, and
a removable insert removably coupled to said mid-sole such that said removable insert can be inserted and then removed and replaced with a different removable insert for treating different equine hoof related ailments.

10. The equine hoof-ware of claim 9 wherein said peripheral wall includes an upwardly and inwardly extending forward most end, an upwardly and outwardly extending rearward most end, and a pair of spaced apart upwardly extending sidewalls interposed between said forward most end and said rearward most end of said peripheral wall for defining said receiving area.

11. The equine hoof-ware of claim 10 further including a front upper connected to said sole and interiorly circumscribing said forward most end and said pair of sidewalls of said sole for defining an opening for receiving an equine hoof into said front upper and onto said mid-sole and sole.

12. The equine hoof-ware of claim 11 wherein said front upper extends upwardly from said sole and mid-sole at an angle and terminates into an upper edge which angles downwardly from said forward most end to said rearward most end of said sole such that said front upper tapers from said forward most end to said rearward most end of said sole for substantially covering forward and side regions of the equine hoof received therein.

13. The equine hoof-ware of claim 12 further including a contoured back upper comprised of a lower section operatively coupled to said rearward most end of said sole, an upwardly extending bulb section integrally formed with said lower section and shaped to receive an equine bulb of a heel, and a pair of extensions integrally formed with said upwardly extending bulb section for wrapping around said front upper.

14. The equine hoof-ware of claim 13 further including means for coupling said pair of extensions to said front upper such that when said equine hoof is received into said front upper and onto said mid-sole and sole and when said pair of extensions are coupled to said front upper the equine hoof is essentially surrounded and secured within the Equine hoof-ware.

15. The equine hoof-ware of claim 14 wherein said upwardly extending bulb section includes a vented back comprised of breathable backing holes for providing through air flow.

16. Equine hoof-ware, comprising in combination:
a sole having a base circumscribed by a peripheral wall for defining a receiving area;
a mid-sole received within said receiving area and circumscribed by said peripheral wall;
a removable insert removably coupled to said mid-sole such that said removable insert can be inserted and then removed and replaced with a different removable insert for treating different equine hoof related aliments;
a front upper connected to an interior of said peripheral wall for defining an opening for receiving an equine hoof into said front upper and onto said mid-sole and sole for substantially covering a forward region and side regions of the equine hoof received therein;
a contoured back upper comprised of a lower section operatively coupled to a rearward most end of said sole, an upwardly extending bulb section integrally formed with said lower section and shaped to receive an equine bulb of a heel, and a pair of extensions integrally formed with said upwardly extending bulb section for wrapping around said front upper, and
means for coupling said pair of extensions to said front upper such that when said equine hoof is received into said front upper and onto said mid-sole and sole and when said pair of extensions are coupled to said front upper the equine hoof is essentially surrounded and secured within the Equine hoof-ware.

17. The equine hoof-ware of claim 16 wherein said upwardly extending bulb section includes a vented back comprised of breathable backing holes for providing through air flow.

\* \* \* \* \*